United States Patent
Cha et al.

(10) Patent No.: US 12,393,100 B2
(45) Date of Patent: Aug. 19, 2025

(54) CAMERA MODULE AND OPTICAL DEVICE COMPRISING SAME

(71) Applicant: LG INNOTEK CO., LTD., Seoul (KR)

(72) Inventors: Won Jun Cha, Seoul (KR); Youn Baek Jeong, Seoul (KR); Ji Yoon Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/680,209

(22) Filed: May 31, 2024

(65) Prior Publication Data

US 2024/0319564 A1    Sep. 26, 2024

Related U.S. Application Data

(63) Continuation of application No. 16/982,487, filed as application No. PCT/KR2019/003110 on Mar. 18, 2019, now Pat. No. 12,032,279.

(30) Foreign Application Priority Data

Mar. 20, 2018  (KR) .................. 10-2018-0031894
Mar. 23, 2018  (KR) .................. 10-2018-0033651

(51) Int. Cl.
  *G03B 5/00*      (2021.01)
  *G02B 7/09*      (2021.01)
  (Continued)

(52) U.S. Cl.
  CPC ............. *G03B 5/00* (2013.01); *G02B 7/09* (2013.01); *G02B 27/646* (2013.01); *G03B 13/36* (2013.01); *G03B 2205/0007* (2013.01)

(58) Field of Classification Search
  None
  See application file for complete search history.

(56) References Cited

U.S. PATENT DOCUMENTS

2013/0010176 A1* 1/2013 Kagaya ............... G03B 11/00
                                                        348/340
2013/0128108 A1* 5/2013 Oh ........................ H04N 23/54
                                                        348/374

(Continued)

FOREIGN PATENT DOCUMENTS

CN   104811589 A   7/2015
CN   105739218 A   7/2016

(Continued)

OTHER PUBLICATIONS

Extended European Search Report for European Application No. 19770601.3, dated Nov. 8, 2021.

*Primary Examiner* — Bao-Luan Q Le
*Assistant Examiner* — Danell L Owens
(74) *Attorney, Agent, or Firm* — Birch, Stewart, Kolasch & Birch, LLP

(57) ABSTRACT

A camera module includes a lens barrel moving in the direction of the optical axis, a holder disposed below the lens barrel and having a seating portion recessed in the top surface thereof, a filter disposed on the bottom surface of the seating portion of the holder, a first adhesive member disposed between the bottom surface of the seating portion and a lower surface of the filter and comprising a second opening, a second adhesive member disposed in the groove portion to be coupled to the filter, and an image sensor disposed under the filter.

20 Claims, 22 Drawing Sheets

(51) Int. Cl.
*G02B 27/64* (2006.01)
*G03B 13/36* (2021.01)

(56) References Cited

U.S. PATENT DOCUMENTS

| | | |
|---|---|---|
| 2016/0187670 A1 | 6/2016 | Kim |
| 2017/0038661 A1 | 2/2017 | Ha |
| 2017/0123178 A1 | 5/2017 | Wang et al. |
| 2018/0329277 A1 | 11/2018 | Han et al. |

FOREIGN PATENT DOCUMENTS

| | | |
|---|---|---|
| CN | 106973210 A | 7/2017 |
| JP | 2005-252990 A | 9/2005 |
| JP | 2006-106716 A | 4/2006 |
| JP | 2013-110593 A | 6/2013 |
| KR | 10-2010-0011209 A | 2/2010 |
| KR | 10-2010-0132477 A | 12/2010 |
| KR | 10-2016-0009866 A | 1/2016 |
| KR | 10-2016-0080263 A | 7/2016 |
| KR | 10-2016-0080627 A | 7/2016 |
| KR | 10-2017-0085704 A | 7/2017 |

\* cited by examiner

CAMERA MODULE AND OPTICAL DEVICE COMPRISING SAME

CROSS REFERENCE TO RELATED APPLICATIONS

This application is a Continuation of U.S. application Ser. No. 16/982,487, filed on Sep. 18, 2020, which is the National Phase of PCT International Application No. PCT/KR2019/003110, filed on Mar. 18, 2019, which claims priority under 35 U.S.C. 119 (a) to Patent Application No. 10-2018-0031894, filed in the Republic of Korea on Mar. 20, 2018, and Patent Application No. 10-2018-0033651, filed in the Republic of Korea on Mar. 23, 2018, all of these applications are hereby expressly incorporated by reference into the present application.

TECHNICAL FIELD

Embodiments relate to a camera module and an optical device including the same.

BACKGROUND ART

Technology of a voice coil motor (VCM), which is used in conventional general camera modules, is difficult to apply to a micro-scale camera module intended to exhibit low power consumption, and study related thereto has been actively conducted.

In the case of a camera module configured to be mounted in a small electronic product, such as a smartphone, the camera module may frequently receive shocks when in use, and may undergo fine shaking due to, for example, user hand tremor while capturing an image. In consideration of this fact, technology for additionally installing a device for inhibiting transfer of hand tremor to a camera module has recently been developed.

DISCLOSURE

Technical Problem

Embodiments provide a camera module and an optical device capable of suppressing or preventing collision of a filter and a blocking member with a holder due to external impacts and suppressing shifting or rotation of the filter when the filter is attached to a seating portion of the holder.

In addition, embodiments provide a camera module and an optical device capable of preventing bursting and cracking of a thermosetting adhesive due to voids formed in a process of curing the thermosetting adhesive and reducing the time taken for the curing process for attaching a printed circuit board and a holder.

Technical Solution

A camera module according to an embodiment includes a lens barrel configured to be movable in an optical-axis direction, a holder disposed under the lens barrel and including a seating portion recessed from the upper surface thereof, a filter disposed on the bottom surface of the seating portion of the holder, a blocking member disposed on the upper surface of the filter, and an image sensor disposed under the filter. The seating portion includes an inner side surface facing a side surface of the filter, and the inner side surface of the seating portion includes a first surface and a second surface positioned under the first surface. The spacing distance from the first surface to the side surface of the filter is greater than the spacing distance from the second surface to the side surface of the filter, and the thickness of the filter is greater than the spacing distance from the second surface to the side surface of the filter.

The spacing distance from the first surface to a side surface of the blocking member may be greater than the spacing distance from the second surface to the side surface of the filter.

The camera module may further include an adhesive member disposed between the lower surface of the filter and the bottom surface of the seating portion, and the distance from the adhesive member to the upper surface of the filter may be greater than the spacing distance from the second surface to the side surface of the filter.

The camera module may further include an adhesive member disposed between the lower surface of the filter and the bottom surface of the seating portion, and the distance from the adhesive member to the upper surface of the blocking member may be greater than the spacing distance from the second surface to the side surface of the filter.

The distance from the lower surface of the filter to the upper surface of the blocking member may be greater than the spacing distance from the second surface to the side surface of the filter.

The thickness of the filter may be greater than or equal to the length obtained by subtracting the spacing distance from the second surface to the side surface of the filter from the spacing distance from the first surface to the side surface of the filter.

The second surface may protrude in a direction from the first surface toward the side surface of the filter, and may be disposed so as to surround the side surface of the filter.

An opening corresponding to the image sensor may be formed in the bottom surface of the seating portion, the outer side surface of the blocking member may be contiguous with the side surface of the filter, and the blocking member may overlap the bottom surface of the seating portion in the optical-axis direction.

The inner side surface of the seating portion may further include a third surface connecting the first surface and the second surface and formed to be parallel to the bottom surface of the seating portion, and the height from the bottom surface of the seating portion to the third surface may be greater than the height to the center point of the side surface of the filter disposed in the seating portion.

The height to the third surface may be equal to or less than the height to the upper surface of the blocking member.

The upper end of the first surface may be positioned higher than the upper surface of the blocking member.

The first surface and the second surface of the seating portion may be contiguous with each other. The portion at which the first surface and the second surface are contiguous with each other may be positioned higher than the center point of the side surface of the filter, and may be positioned lower than or at the same height as the upper surface of the blocking member.

The spacing distance from the first surface to the side surface of the blocking member may gradually increase in a direction from the lower surface of the holder toward the upper surface of the holder.

Each of the angle at which the first surface is inclined with respect to the bottom surface of the seating groove and the angle at which the second surface is inclined with respect to the bottom surface of the seating groove may be a right angle or an obtuse angle.

The ratio of the spacing distance from the second surface to the side surface of the filter to the spacing distance from the first surface to the side surface of the filter may be 1:2.8 to 1:8.

The holder may include a stopper, which faces a portion of the lower portion of the lens barrel in the optical-axis direction and is recessed from the upper surface of the seating portion. The bottom surface of the stopper may be positioned higher than the upper surface of the filter disposed in the seating portion in the optical-axis direction on the basis of the bottom surface of the seating portion.

A camera module according to an embodiment includes a lens barrel configured to be movable in an optical-axis direction, a holder disposed under the lens barrel and including a seating portion recessed from the upper surface thereof, an opening formed in the bottom surface of the seating portion, and a groove portion formed in the inner side surface of the seating portion, a filter disposed on the bottom surface of the seating portion, a first adhesive member disposed between the bottom surface of the seating portion and the lower surface of the filter, a second adhesive member disposed in the groove portion in the holder to be coupled to the filter, and an image sensor disposed under the filter.

The groove portion may be positioned in a first inner side surface, which is positioned between two adjacent corners of the seating portion.

The inner side surface of the seating portion may include a first inner side surface facing a first side surface of the filter. The groove portion in the seating portion may be formed in the first inner side surface, and may be recessed from the first inner side surface in a direction from the first side surface of the filter toward the first inner side surface.

The groove portion may be open to the upper surface of the holder, and may be connected to the bottom surface of the seating portion.

The groove portion may not overlap the filter in the optical-axis direction.

The length of the opening in the first adhesive member in the longitudinal direction of the first inner side surface may be less than the length of the groove portion in the longitudinal direction of the first inner side surface.

The second portion of the second adhesive member may protrude from the first adhesive member.

The width of the second adhesive member may be greater than the width of the first adhesive member.

The camera module may further include a printed circuit board disposed under the holder and a third adhesive member disposed between the printed circuit board and the lower surface of the holder.

Each of the first and second adhesive members may be a UV curable adhesive member, and the third adhesive member may be a thermosetting adhesive member.

The first adhesive member and the second adhesive member may be formed of the same material as each other.

Advantageous Effects

Embodiments are capable of suppressing or preventing collision of a filter and a blocking member with a holder due to external impacts and suppressing shifting or rotation of the filter when the filter is attached to a seating portion of the holder.

In addition, embodiments are capable of preventing bursting and cracking of a thermosetting adhesive due to voids formed in a process of curing the thermosetting adhesive and reducing the time taken for the curing process for attaching a printed circuit board and a holder.

BEST MODE

Figure 1:
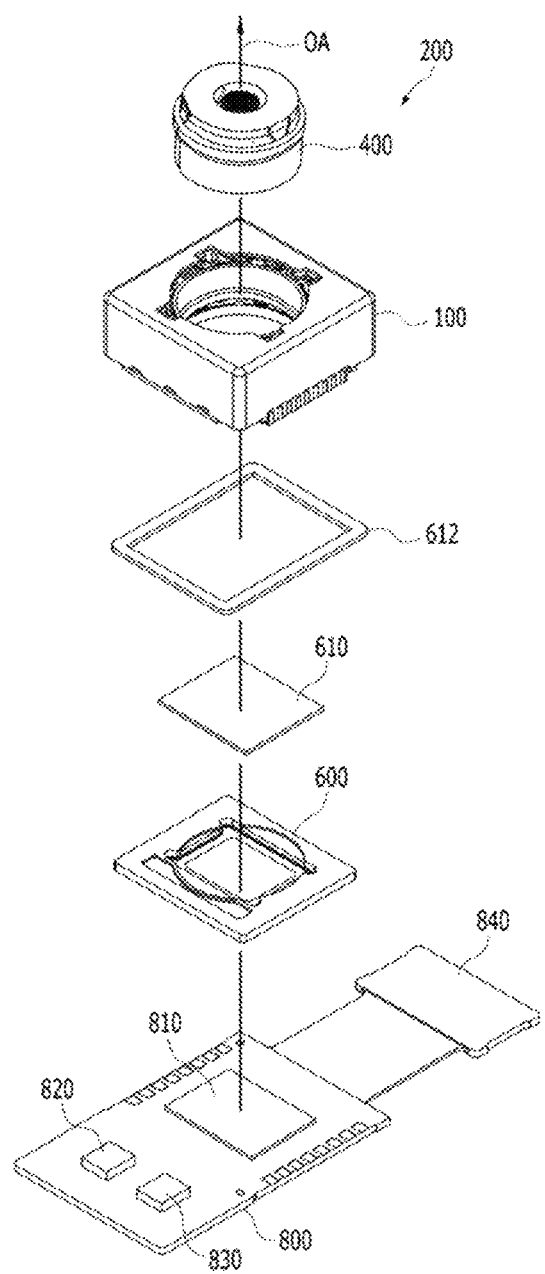
FIG. 1 is an exploded perspective view of a camera module according to an embodiment.

Hereinafter, embodiments of the present disclosure, which may concretely realize the objects described above, will be described with reference to the accompanying drawings.

In the following description of the embodiments, it will be understood that, when each element is referred to as being "on" or "under" another element, it can be directly on or under the other element, or can be indirectly formed such that one or more intervening elements are also present. In addition, when an element is referred to as being "on or under", "under the element" as well as "on the element" may be included based on the element.

In addition, the relational terms "first", "second", "on/upper part/above", and "under/lower part/below" are used herein only to distinguish between one subject or element and another subject or element without necessarily requiring or involving any physical or logical relationship or sequence between such subjects or elements. Wherever possible, the same reference numerals will be used throughout the drawings to refer to the same parts.

Additionally, the terms "comprises", "includes", and "has" described herein should be interpreted not to exclude other elements but to further include such other elements, since the corresponding elements may be inherent unless mentioned otherwise. In addition, the term "corresponding to" herein may encompass at least one of the meanings of "facing" and "overlapping".

Hereinafter, a camera module and an optical device including the same according to embodiments will be described with reference to the accompanying drawings. For convenience of description, a camera module according to the embodiments will be described using the Cartesian coordinate system (x, y, z), but the embodiments are not limited thereto, and may be described using other coordinate systems. In the respective drawings, the x-axis and the y-axis may be directions perpendicular to the z-axis, which is an optical-axis (OA) direction, the z-axis direction, which is the optical-axis (OA) direction, may be referred to as a 'first direction', the x-axis direction may be referred to as a 'second direction', and the y-axis direction may be referred to as a 'third direction'. In addition, hereinafter, the term "terminal" may be referred to as a pad, an electrode, or a conductive layer.

A 'hand tremor compensation function' applied to a small camera module of a mobile device such as a smartphone or a tablet PC may be a function of moving a lens in a direction perpendicular to the optical-axis direction or tilting the lens with respect to the optical axis so as to cancel vibration (or motion) caused by user hand tremor.

In addition, an 'autofocus function' may be a function of automatically focusing on an object by moving the lens in the optical-axis direction according to the distance to the object so that an image sensor obtains a clear image of the object.

FIG. 1 is an exploded perspective view of a camera module 200 according to an embodiment.

Referring to FIG. 1, the camera module 200 may include a lens or a lens barrel 400, a lens-moving apparatus 100, a filter 610, a holder 600, a printed circuit board 800, and an image sensor 810. Hereinafter, the "camera module" may be referred to as an "image-capturing device" or a "photographing device", and the holder may be referred to as a sensor base.

In addition, the camera module 300 may further include a blocking member 1500 disposed on the filter 610.

In addition, the camera module 300 may further include an adhesive member 612.

In addition, the camera module 300 may further include a motion sensor 820, a controller 830, and a connector 840.

The lens or the lens barrel 400 may be mounted in a bobbin 110 of the lens-moving apparatus 100, and may be configured to be movable in the optical-axis direction.

The holder 600 may be disposed under the base 210 of the lens-moving apparatus 100.

For example, the holder 600 may be disposed under the lens or the lens barrel 400.

The filter 610 is mounted to the holder 600.

The holder 600 may include a seating portion 500, which is recessed from the upper surface thereof and on which the filter 610 is seated. The filter 610 may be disposed in the seating portion 500.

The seating portion 500 may be a recess, a cavity, or a hole, which is concavely formed in the upper surface of the holder 600.

The adhesive member 612 may couple or attach the base 210 of the lens-moving apparatus 100 to the holder 600. For example, the adhesive member 612 may be disposed between the lower surface of the base 210 and the upper surface of the holder 600, and may bond these two components to each other.

The adhesive member 612 may serve not only to bond components, as described above, but also to prevent foreign substances from entering the lens-moving apparatus 100. For example, the adhesive member 612 may be an epoxy, a thermosetting adhesive, or an ultraviolet curable adhesive.

The seating portion 500 of the holder 600 may include an inner side surface 511 and a bottom surface 512.

The filter 610 may be disposed on the bottom surface 512 of the seating portion 500 of the holder 600.

The holder 600 may have an opening 501, which is formed in the region thereof in which the filter 610 is mounted or disposed so that light passing through the filter 610 enters the image sensor 810.

For example, the opening 501 may penetrate the holder 600 in the optical-axis direction, and may be referred to as a "through-hole".

For example, the opening 501 may penetrate the center of the holder 600, and may be disposed so as to correspond to or face the image sensor 810.

For example, the opening 501 may be provided in the bottom surface 512 of the seating portion 500, and the area of the opening 501 may be smaller than the area of the filter 610.

For example, the filter 610 may be disposed on the bottom surface 512 of the seating portion 500 of the holder 600.

The filter 610 may serve to block light in a specific frequency band, among the light passing through the lens barrel 400, from entering the image sensor 810.

For example, the filter 610 may be an infrared cut-off filter, without being limited thereto. For example, the filter 610 may be disposed parallel to the x-y plane, which is perpendicular to the optical axis OA.

The filter 610 may be attached to the bottom surface 512 of the seating portion 500 of the holder 600 using an adhesive member (not shown) such as UV epoxy.

The printed circuit board 800 may be disposed under the holder 600, and the image sensor 810 may be mounted or disposed on the printed circuit board 800. The image sensor 810 may be a part on which the light that has passed through the filter 610 is incident and in which an image included in the light is formed.

The printed circuit board 800 may be provided with various circuits, elements, and controllers in order to convert an image formed by the image sensor 810 into an electrical signal and to transmit the electrical signal to an external device.

A circuit pattern, which is electrically connected to the image sensor and various elements, may be formed on the printed circuit board 800.

The holder 600 may be referred to as a first holder, and the printed circuit board 800 may be referred to as a second holder.

The image sensor 810 may receive an image included in the light introduced through the lens-moving apparatus 100, and may convert the received image into an electrical signal.

For example, the image sensor 810 may include a photographing area 811 (refer to FIG. 6) for sensing the light that has passed through the lens or the lens barrel 400. Here, the photographing area 811 may be referred to as an effective area, a light reception area, or an active area.

The filter 610 and the image sensor 810 may be disposed so as to be spaced apart from each other and to face each other in the optical-axis (OA) direction or the first direction.

The motion sensor 820 may be mounted or disposed on the printed circuit board 800, and may be electrically connected to the controller 830 via a circuit pattern provided on the printed circuit board 800.

The motion sensor 820 outputs rotating angular speed information according to the motion of the camera module 200. The motion sensor 820 may be implemented as a 2- or 3-axis gyro sensor or an angular speed sensor.

The controller 830 is mounted or disposed on the printed circuit board 800.

The printed circuit board 800 may be electrically connected to the lens-moving apparatus 100. For example, the printed circuit board 800 may be electrically connected to a printed circuit board 250 of the lens-moving apparatus 100.

For example, a driving signal may be provided to each of a first coil 120 and a second coil 230 of the lens-moving apparatus 100 through the printed circuit board 800, and a driving signal may be provided to an AF position sensor (or an OIS position sensor). Further, the output of the AF position sensor (or the OIS position sensor) may be transmitted to the printed circuit board 800.

The connector 840 may be electrically connected to the printed circuit board 800, and may include a port to be electrically connected to an external device.

The camera module 200 may be any one of an autofocus (AF) camera module and an optical image stabilizer (OIS) camera module. The AF camera module is a camera module configured to perform only an autofocus function, and the OIS camera module is a camera module configured to perform an autofocus function and an optical image stabilizer (OIS) function.

For example, the lens-moving apparatus 100 may be an AF lens-moving apparatus or an OIS lens-moving apparatus, and the meanings of "AF" and "OIS" may be the same as those of the AF camera module and the OIS camera module.

Figure 2A:
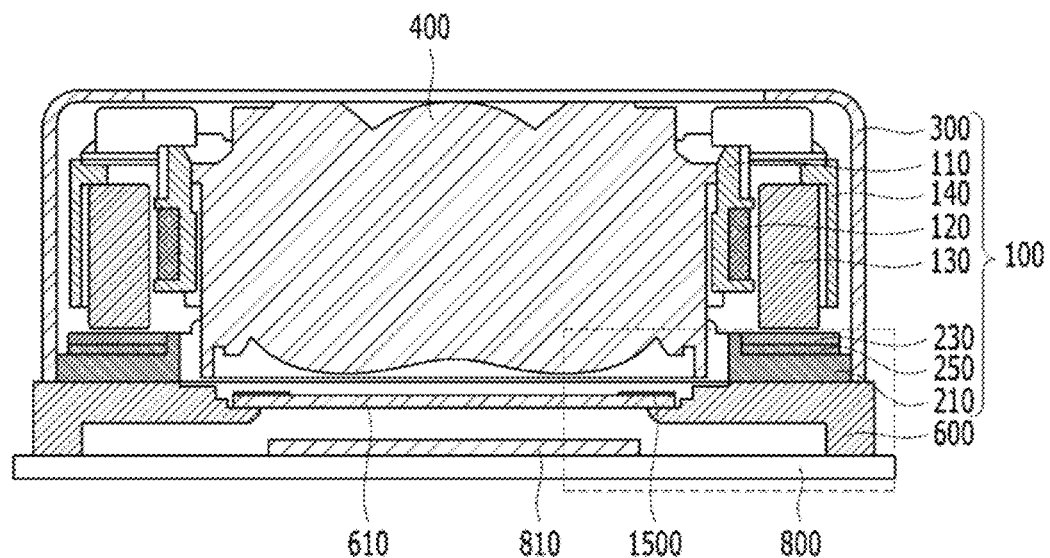
FIG. 2A is a cross-sectional view of an embodiment of the camera module of FIG. 1.
Figure 2B:
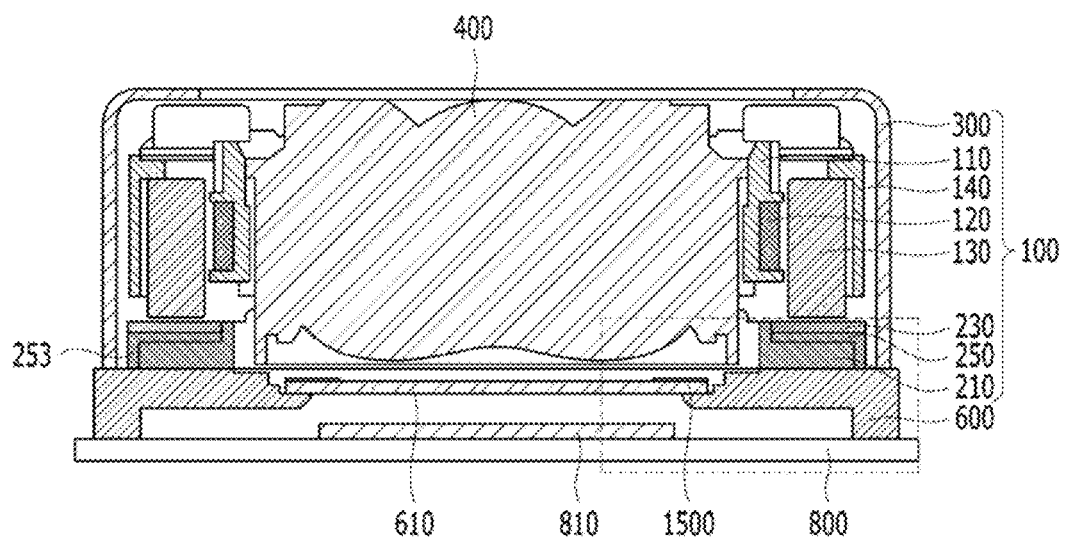
FIG. 2B is a cross-sectional view seen in a direction perpendicular to the cross-sectional view of FIG. 2A.

FIG. 2A is a cross-sectional view of an embodiment of the camera module 200 of FIG. 1, and FIG. 2B is a cross-sectional view seen in a direction perpendicular to the cross-sectional view of FIG. 2A. The same reference numerals as those of FIG. 1 denote the same components.

Referring to FIGS. 2A and 2B, the lens-moving apparatus 100 of the camera module 200 may be an OIS lens-moving apparatus.

The lens-moving apparatus 100 may include a housing 140, a bobbin 110 disposed in the housing 140 to allow the lens or the lens barrel 400 to be mounted thereto, a first coil 120 disposed at the bobbin 110, a magnet 130 disposed in the housing 140 so as to face the first coil 120, at least one upper elastic member (not shown) coupled to the upper portion of the bobbin 110 and the upper portion of the housing 140, at least one lower elastic member (not shown) coupled to the lower portion of the bobbin 110 and the lower portion of the housing 140, a second coil 230 disposed under the bobbin 110 (and/or the housing 140), a printed circuit board 250 disposed under the second coil 230, and a base 210 disposed under the printed circuit board 250.

In addition, the lens-moving apparatus 100 may further include a cover member 300 coupled to the base 210 to provide a space for accommodating the components of the lens-moving apparatus 100 together with the base 210.

In addition, the lens-moving apparatus 100 may further include a support member, which electrically connects the printed circuit board 250 to the upper elastic member and supports the housing 140 with respect to the base 210. Each of the first coil 120 and the second coil 230 may be electrically connected to the printed circuit board 250, and may receive a driving signal (driving current) from the printed circuit board 250.

For example, the upper elastic member may include a plurality of upper springs, the support member may include support members connected to the upper springs, and the first coil 120 may be electrically connected to the printed circuit board 250 via the upper springs and the support member. The printed circuit board 250 may include a plurality of terminals, and some of the plurality of terminals may be electrically connected to the first coil 120 and/or the second coil 230.

The bobbin 110 and the lens or the lens barrel 400 coupled thereto may be moved in the optical-axis direction due to the electromagnetic force generated by interaction between the first coil 120 and the magnet 130, and accordingly, the displacement of the bobbin 110 in the optical-axis direction may be controlled, whereby an AF operation may be implemented.

In addition, the housing 140 may be moved in a direction perpendicular to the optical axis due to the electromagnetic force generated by interaction between the second coil 230 and the magnet 130, and accordingly, a hand tremor compensation or OIS operation may be implemented.

In addition, in order to implement an AF feedback operation, the lens-moving apparatus 100 of the camera module 200 may further include a sensing magnet (not shown) disposed at the bobbin 110 and an AF position sensor (e.g. a hall sensor) (not shown) disposed in the housing 140. In addition, the lens-moving apparatus 100 may further include a printed circuit board (not shown) disposed in the housing and/or on the base to allow the AF position sensor to be disposed or mounted thereon. In another embodiment, the AF position sensor may be disposed at the bobbin, and the sensing magnet may be disposed in the housing. In addition, the lens-moving apparatus 100 may further include a balancing magnet disposed at the bobbin 110 so as to correspond to the sensing magnet.

The AF position sensor may output an output signal according to the result of detection of the magnitude of the magnetic field of the sensing magnet upon movement of the bobbin 100. The AF position sensor may be electrically connected to the printed circuit board 250 via the upper elastic member (or the lower elastic member) and/or the support member. The printed circuit board 250 may provide a driving signal to the AF position sensor, and the output of the AF position sensor may be transmitted to the printed circuit board 250.

In another embodiment, the lens-moving apparatus 100 may be an AF lens-moving apparatus, and the AF lens-moving apparatus may include a housing, a bobbin disposed in the housing, a coil disposed at the bobbin, a magnet disposed in the housing, at least one elastic member coupled to the bobbin and the housing, and a base disposed under the bobbin (and/or the housing). For example, the elastic member may include the upper elastic member and the lower elastic member described above.

A driving signal (e.g. driving current) may be provided to the coil, and the bobbin may be moved in the optical-axis direction due to the electromagnetic force generated by interaction between the coil and the magnet. In another embodiment, the coil may be disposed in the housing, and the magnet may be disposed at the bobbin.

In addition, in order to implement an AF feedback operation, the AF lens-moving apparatus may further include a sensing magnet disposed at the bobbin, an AF position sensor (e.g. a hall sensor) disposed in the housing, and a printed circuit board disposed or mounted in the housing and/or on the base to allow the AF position sensor to be mounted thereon. In another embodiment, the AF position sensor may be disposed at the bobbin, and the sensing magnet may be disposed in the housing.

The printed circuit board may be electrically connected to the coil and the AF position sensor, a driving signal may be provided to each of the coil and the AF position sensor through the printed circuit board, and the output of the AF position sensor may be transmitted to the printed circuit board.

Figure 3:
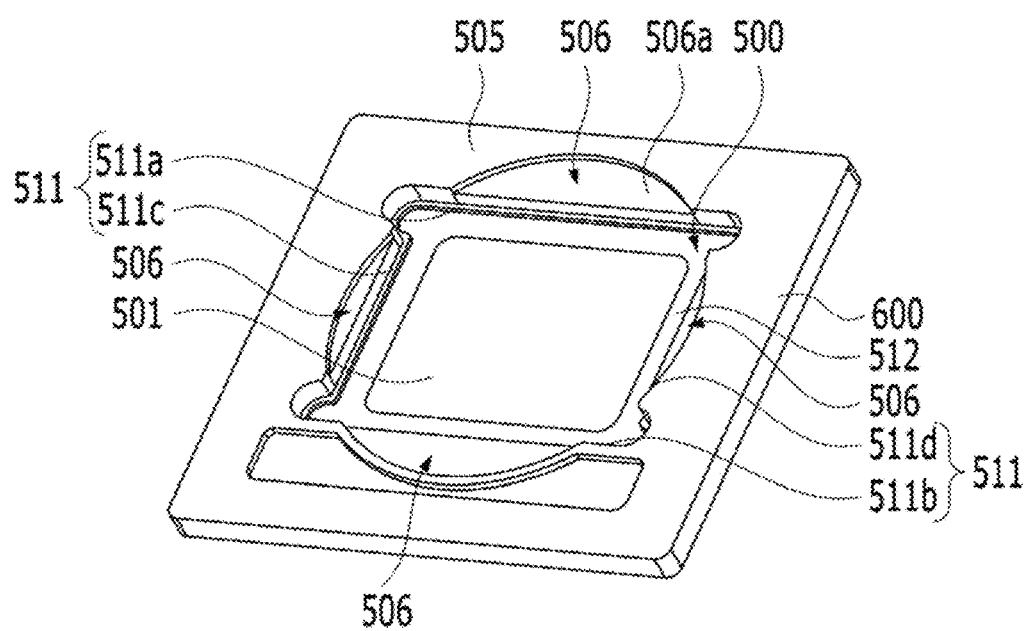
FIG. 3 is a perspective view of a holder.
Figure 4:
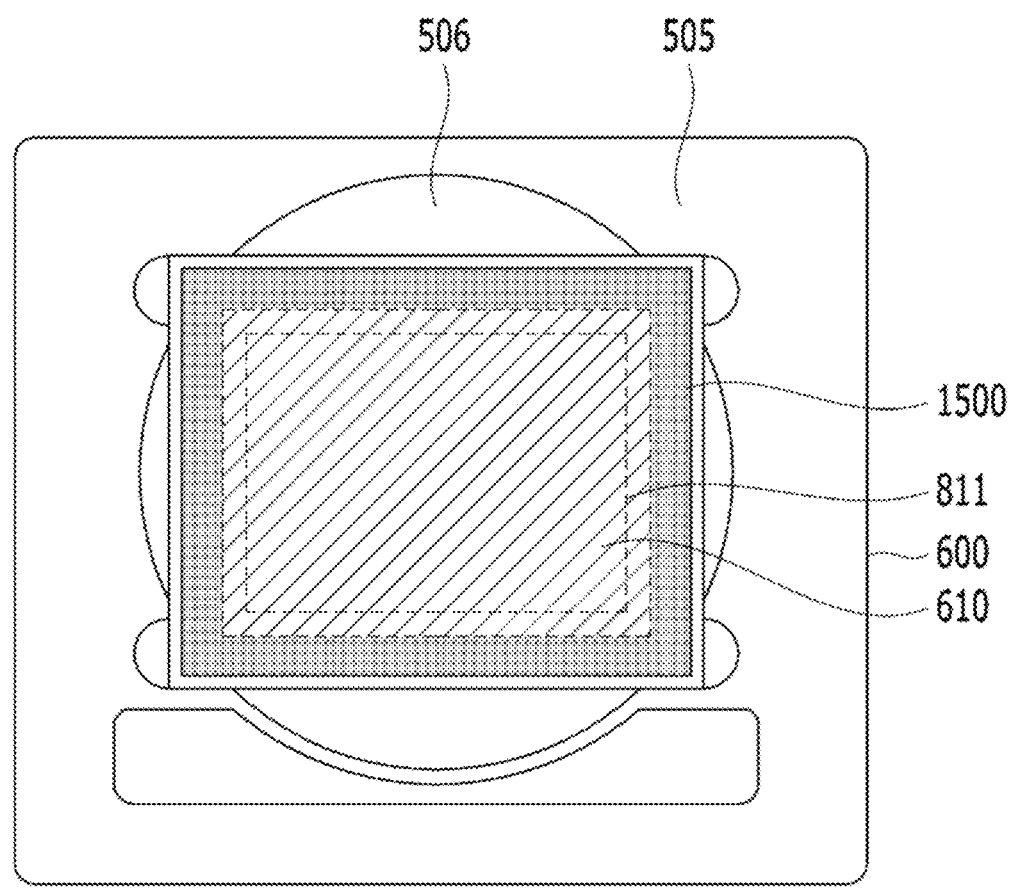
FIG. 4 is a plan view of the holder, a filter, and a blocking member.
Figure 5:
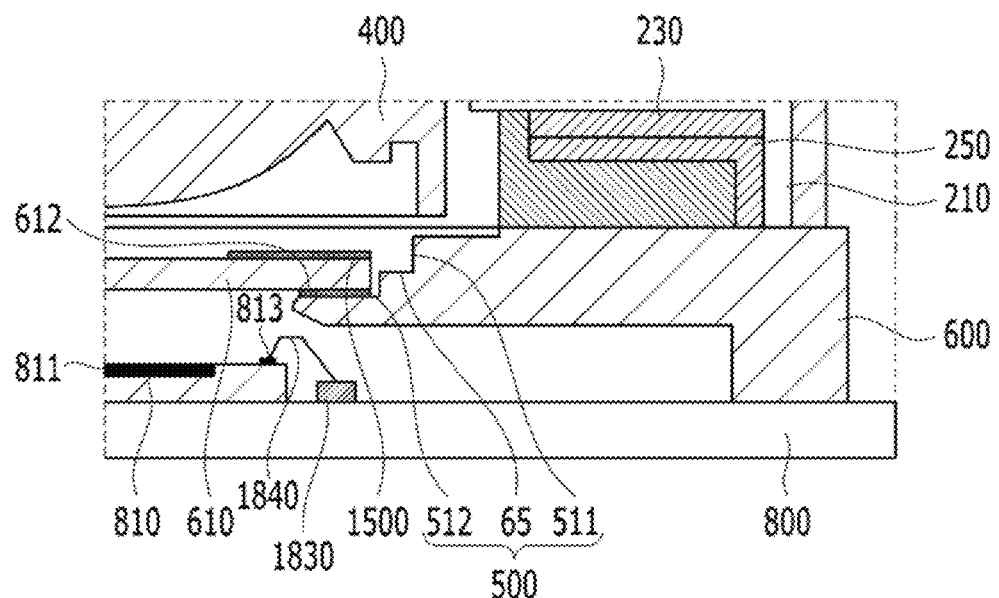
FIG. 5 is an enlarged view of the portion indicated by the dotted line in FIG. 2.
Figure 6:
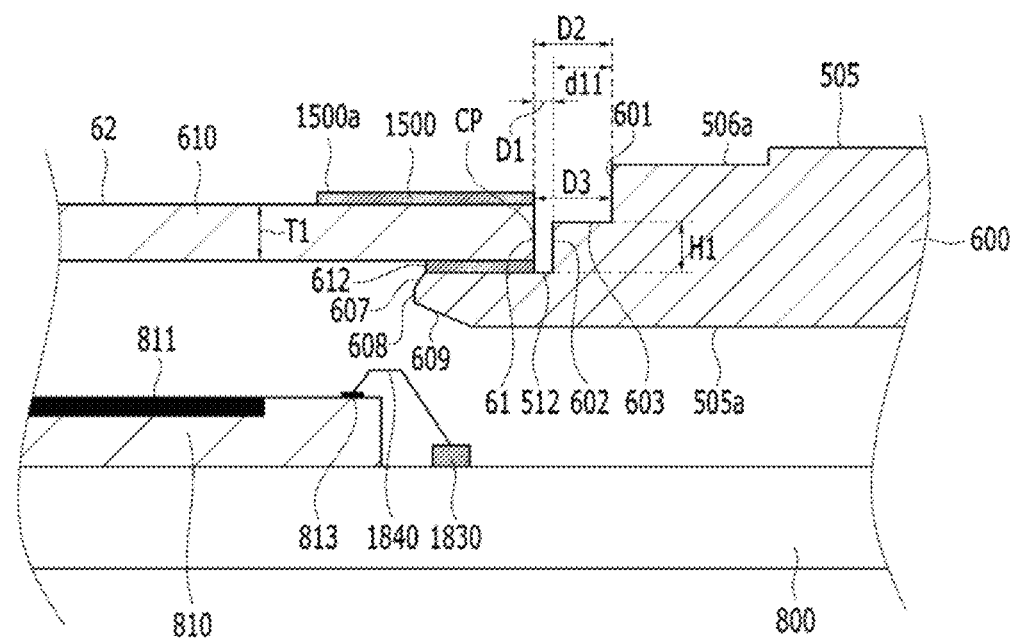
FIG. 6 is a partial enlarged view of FIG. 5.
Figure 7:
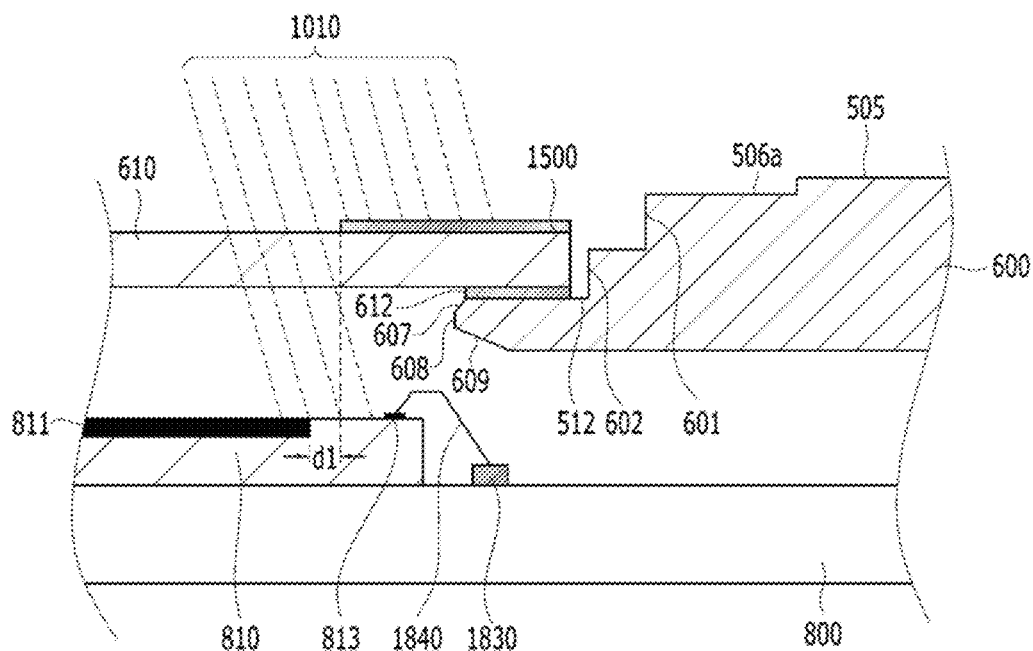
FIG. 7 is a view for explaining the function of the blocking member.

FIG. 3 is a perspective view of the holder 600, FIG. 4 is a plan view of the holder 600, the filter 610, and the blocking member 1500, FIG. 5 is an enlarged view of the portion indicated by the dotted line 15 in FIG. 2, FIG. 6 is a partial enlarged view of FIG. 5, and FIG. 7 is a view for explaining the function of the blocking member 1500.

Referring to FIGS. 3 to 7, the holder 600 may be disposed on the printed circuit board 800, and may accommodate the filter 610 therein.

The holder 600 may support the lens-moving apparatus 100 positioned thereon.

The lower surface of the base 210 of the lens-moving apparatus 100 may be disposed on the upper surface 505 of the holder 600. For example, the lower surface of the base 210 of the lens-moving apparatus 100 may be in contact with the upper surface 505 of the holder 600, and may be supported by the upper surface 505 of the holder 600.

The holder 600 may include a seating portion 500 that is recessed from the upper surface 505, and the seating portion 500 may include an inner side surface 511 and a bottom surface 512.

At least a portion of the inner side surface 511 of the seating portion 500 may face the side surface of the filter 610.

The inner side surface 511 of the seating portion 500 may include a first inner side surface 511a and a second inner side surface 511b facing the first inner side surface 511a, and may include a third inner side surface 511c and a fourth inner side surface 511d positioned between the first inner side surface 511a and the second inner side surface 511b and facing each other.

The holder 600 may include a stopper 506 disposed around the seating portion 500 and recessed from the upper surface 505. The stopper 506 may have a groove shape, without being limited thereto. In another embodiment, the stopper 506 may have a protrusion shape protruding from the upper surface 505 in the optical-axis direction.

For example, the stopper 506 may be connected to or contiguous with the inner side surface 511 of the seating portion 500, without being limited thereto. In another embodiment, the stopper 506 may be spaced apart from the inner side surface 511 of the seating portion 500.

The bottom surface 506a of the stopper 506 may be positioned higher than the upper surface 62 of the filter 610, which is disposed on the seating portion 500, in the optical-axis direction on the basis of the bottom surface 512 of the seating portion 500.

For example, the bottom surface 512 of the seating portion 500 may have a first height difference, and the bottom surface 506a of the stopper 506 may have a second height difference from the upper surface 505 of the holder 600 in the optical-axis direction. The second height difference may be less than the first height difference.

The lower end of the lens or the lens barrel 400, which is moved by the AF operation, may come into contact with the bottom surface 506a of the stopper 506, but may be prevented from moving below the bottom surface 506a by the bottom surface 506a. Accordingly, the stopper 506 may prevent spatial interference between the lower end of the lens or the lens barrel 400 mounted to the lens-moving apparatus 100 and the upper surface 62 of the filter 610. That is, during the AF operation, collisions between the lens or the lens holder 400 of the lens-moving apparatus 100 and the upper surface 62 of the filter 610 may be prevented by the stopper 506.

For example, the stopper 506 may include therein four grooves, which are spaced apart from each other so as to be disposed corresponding to the first to fourth inner side surfaces 511a to 511d of the seating portion 500.

For example, each of the four grooves in the stopper 506 may be contiguous with a corresponding one of the first to fourth inner side surfaces 511a to 511d. For example, each of the grooves in the stopper 506 may be disposed at the center region of a corresponding one of the first to fourth inner side surfaces 511a to 511d.

The overall shape of the four grooves in the stopper 506 may match the shape of the lens or the lens barrel.

The holder 600 may include a foreign-substance-collecting portion 507, which is formed in the shape of a groove recessed from the upper surface 505. The foreign-substance-collecting portion 507 may be disposed adjacent to the stopper 506, without being limited thereto. The foreign-substance-collecting portion 507 may collect foreign substances introduced from the lens-moving apparatus 100. The foreign-substance-collecting portion 507 may be referred to as a dust trapper.

In addition, the holder 600 may include a concave portion 508 disposed at a corner region of the inner side surface 511 of the seating portion 500. The concave portion 508 may have a structure that is recessed in a direction from the center of the opening 501 in the seating portion 500 toward the corner region of the inner side surface 511 of the seating portion 500. The concave portion 508 may prevent an adhesive member, such as UV epoxy, for attaching the filter 610 to the seating portion 500 from overflowing out of the seating portion 500.

Referring to FIGS. 4 to 6, the inner side surface 511 of the seating portion 500 of the holder 600 may include a first surface 601 and a second surface 602 positioned under the first surface 601.

The first surface 601 may be connected to the stopper 506, or may be contiguous with the stopper 506 in a region of the inner side surface 511 of the seating recess 500, with which the stopper 506 is contiguous. Further, the first surface 601 may be connected to the upper surface 505 of the holder 600, or may be contiguous with the upper surface 505 in another region of the inner side surface 511 of the seating recess 500, with which the stopper 506 is not contiguous.

The second surface 602 may be connected to the bottom surface 512 of the seating portion 500 or may be contiguous with the bottom surface 512.

The second surface 602 may protrude in a direction from the first surface 601 toward the side surface of the filter 610 on the basis of the first surface 601, and may be disposed so as to surround the side surface of the filter 610.

The filter 610 may be disposed or seated on the bottom surface 512 of the seating portion 500. For example, the lower surface of the filter 610 may be in contact with the bottom surface 512 of the seating portion 500.

The blocking member 1500 may be disposed on the upper surface of the filter 610. The blocking member 1500 may be referred to as a "masking part".

The blocking member 1500 may include therein an opening, e.g. a through-hole, at a position corresponding to the image sensor 810 in the optical-axis direction.

For example, the blocking member 1500 may be disposed on the edge portion of the upper surface 62 of the filter 610, and may serve to block at least a portion of the light traveling toward the edge portion of the filter 610 through the lens or the lens barrel 400 from passing through the filter 610. For example, the blocking member 1500 may be coupled or attached to the upper surface 62 of the filter 1610.

For example, the filter 610 may be formed in a rectangular shape when viewed in the optical-axis direction, and the blocking member 1500 may be formed to be symmetrical with respect to the filter 610 along each side of the upper surface of the filter 610. In this case, the blocking member 1500 may be formed to have a predetermined width on each side of the upper surface of the filter 1610.

For example, the blocking member 1500 may have a rectangular shape, and may include therein a rectangular-shaped opening, without being limited thereto.

The blocking member 1500 may be formed of an opaque material.

The blocking member 1500 may be an opaque and adhesive material that is applied to the filter 610, or may be provided in the form of a film that is attached to the filter 610.

Referring to FIG. 7, the printed circuit board 800 may include a terminal 1830 electrically connected to a terminal 813 provided at the image sensor 810 via a wire 1840.

The terminal 1830 of the printed circuit board 800 may be disposed adjacent to a region of the printed circuit board 800 that is adjacent to the image sensor 1810. For example, the terminal 1830 of the printed circuit board 800 may include a plurality of terminals disposed in a region of the printed circuit board 800 that is positioned around the image sensor 1810.

The filter 610 and the image sensor 810 may be disposed so as to face each other in the optical-axis direction, and at least a portion of the blocking member 1500 may overlap the terminal 1830 and/or the wire 1840 disposed on the printed circuit board 800 in the optical-axis direction. The blocking member 1500 may not overlap the photographing area 811 of the image sensor 810 in the optical-axis direction.

The blocking member 1500, which is disposed on the edge portion of the upper surface 62 of the filter 610, may serve to block an unnecessary portion of incident light 1010, incident on the image sensor 810 through the lens or the lens barrel 1400, from entering the image sensor 810.

The wire 1840 and the terminal 1830 may be formed of a conductive material such as gold, silver, copper, or a copper alloy, and this conductive material may have a property of reflecting light.

That is, light that has passed through the filter 610 may be reflected by the terminal 1830 of the printed circuit board 800 and the wire 1840, and an instantaneous flash, i.e. a flare phenomenon, may occur due to this reflected light. Such a flare phenomenon may distort the image formed by the image sensor 810 or may deteriorate the quality of the image.

Since the blocking member 1500 is disposed such that at least a portion thereof overlaps the terminal 1830 and/or the wire 1840 in the optical-axis direction, the blocking member 1500 may block light traveling toward the terminal 1830 of the printed circuit board 800 and/or the wire 1840 among the light that has passed through the lens or the lens barrel 400, thereby preventing the occurrence of the aforementioned flare phenomenon, thus preventing distortion of the image formed by the image sensor 810 and deterioration in the quality of the image.

The side surface 61 of the filter 610 may be spaced apart from each of the first surface 601 and the second surface 602 of the inner side surface 511 of the seating portion 500.

A region of the bottom portion 512 of the holder 600 corresponding to the space between the side surface 61 of the filter 610 and the second surface 602 of the holder 600 may be a portion corresponding to an alignment guide of the filter 610 when the filter 610 is disposed or seated on the seating portion 500 of the holder 600.

The spacing distance D2 from the first surface 601 to the side surface 61 of the filter 610 is greater than the spacing distance D1 from the second surface 602 to the side surface 61 of the filter 601 (D2>D1).

For example, the ratio of D1 to D2 (D1:D2) may be 1:2.8 to 1:8.

If the value obtained by dividing D2 by D1 (D2/D1) is less than 2.8, the spacing distance between the filter 610 and the first surface 601 may be too small, which may cause a collision between the first surface 601 and the filter 610 due to external impacts.

Further, if the value obtained by dividing D2 by D1 (D2/D1) is greater than 8, the size of the holder 600 may increase, which may cause an increase in the size of the camera module according to the embodiment.

For example, D1 may be 0.015 [mm] to 0.025 [mm], and D2 may be 0.07 [mm] to 0.12 [mm].

The upper surface 62 of the filter 610 may be positioned lower than the bottom surface 506a of the stopper 506 in the optical-axis direction. The reason for this is to avoid spatial interference between the lens or the lens barrel 400 and the filter 610.

The inner side surface 511 of the seating portion 500 may further include a third surface 603 connecting the first surface 601 and the second surface 602. For example, the third surface 603 may be a horizontal surface parallel to the bottom surface 512, without being limited thereto.

The height H1 from the bottom surface 512 of the seating portion 500 to the third surface 603 may be greater than the height to a center point CP of the filter 610 disposed on the bottom surface 512 of the seating portion 500 in the optical-axis direction, and may be less than the height to the upper surface 62 of the filter 610.

For example, the height H1 from the bottom surface 512 of the seating portion 500 to the third surface 603 may be greater than 50% of the thickness of the filter 610, and may be less than 100% of the thickness of the filter 610.

Alternatively, in another embodiment, H1 may be the same as the height to the upper surface 62 of the filter 610. Alternatively, H1 may be the same as the thickness of the filter 610.

If the height H1 is less than the height to the center point CP of the side surface of the filter 610, when the filter 610 is seated or placed on the seating portion 500, the filter 610 may be disposed over the protruding portion 65, which may cause misalignment of the filter 610.

Further, if the height H1 is greater than the thickness of the filter 610, the upper surface of the protruding portion 65 may be positioned higher than the upper surface of the filter 610, which may cause a collision between the protruding portion 65 and the filter 610 due to external impacts and cracking of the filter 610.

Alternatively, in another embodiment, H1 may be the same as the height from the bottom surface 512 of the seating portion 500 to the center point CP.

The height H1 from the bottom surface 512 of the seating portion 500 to the third surface 603 may be less than the height to the lower surface of the blocking member 1500. Alternatively, in another embodiment, H1 may be the same as the height to the lower surface of the blocking member 1500.

For example, the upper end of the first surface 601 may be positioned higher than the upper surface 62 of the filter 610 disposed on the bottom surface 512 of the seating portion 500.

In addition, for example, the upper end of the first surface 601 may be positioned higher than the upper surface of the blocking member 1500.

Here, the upper end of the first surface 601 may be an edge of the first surface 601 that is contiguous with the bottom surface 506a of the stopper 506, or may be an edge of the first surface 601 that is contiguous with the upper surface 505 of the holder 600.

For example, the angle at which each of the first surface 601 and the second surface 602 is inclined with respect to the bottom surface 512 of the seating portion 500 may be a right angle, without being limited thereto.

The height from the bottom surface 512 of the seating portion 500 to the upper surface 1500a of the blocking member 1500 may be less than the height to the first surface 601, without being limited thereto.

The spacing distance D3 from the first surface 601 to the side surface of the blocking member 1500 that corresponds to or faces the first surface 601 is greater than the spacing distance D1 from the second surface 602 to the side surface 61 of the filter 601 (D3>D1).

The side surface or the outer side surface of the blocking member 1500 may be coplanar with the side surface 61 of the filter 610. For example, the side surface or the outer side surface of the blocking member 1500 may be contiguous with the side surface of the filter 610, without being limited thereto. In another embodiment, the side surface of the blocking member 1500 may not be coplanar with the side surface 61 of the filter 610, and may be spaced apart from the side surface 61 of the filter 610 or from an edge at which the side surface of the filter 610 is contiguous with the upper surface of the filter 610.

For example, D3 may be the same as D2, without being limited thereto. In another embodiment, D3 may be greater than D2 (D3>D2).

At least a portion of the blocking member 1500 may overlap the bottom surface 512 of the seating portion 500 in the optical-axis direction. In addition, the blocking member 1500 may overlap at least a portion of the image sensor 810 in the optical-axis direction.

The thickness T1 of the filter 610 may be greater than the spacing distance D1 from the second surface 602 of the holder 600 to the side surface 61 of the filter 610 (T1>D1). Since T1 is greater than D1, when the filter 610 is disposed on the bottom surface 512 of the seating portion 500 of the holder 600, the filter 610 may be effectively aligned.

The thickness T1 of the filter 610 may be greater than or equal to the length d11 obtained by subtracting the spacing distance D1 from the second surface 602 of the holder 6000 to the side surface 61 of the filter 610 from the spacing distance D2 from the first surface 601 of the holder 600 to the side surface 61 of the filter 610 (T1≥d11).

Further, d11 may correspond to the length of the protruding portion 65 of the holder 600 in a direction from the first surface 601 of the holder 600 toward the side surface 61 of the filter 610. For example, the length d11 of the protruding portion 65 of the holder 600 may be greater than the spacing distance D1 from the second surface 602 of the holder 600 to the side surface 61 of the filter 610 (d11>D1).

Since d11 is greater than D1 (d11>D1), the embodiment is capable of suppressing collisions between the upper surface 62 of the filter 610 or the upper portion of the side surface 61 thereof and the first surface 601 of the holder 600 due to external impacts and suppressing or preventing shifting of the filter 610 or rotation of the filter 610 when the filter 610 is attached to the seating portion 500.

The holder 600 may include a protruding portion 65 provided at the lower end of the side surface or the inner side surface 511 of the seating portion 500. The protruding portion 65 may be contiguous with the lower end of the inner side surface 511 of the seating portion 500 and the bottom surface 512 of the seating portion 500. In another embodiment, the protruding portion may be disposed on the inner side surface 511 of the seating portion 500, and may be spaced apart from the bottom surface 512 of the seating portion 500.

For example, the protruding portion 65 may protrude in a direction from the first surface 6010 toward the filter 610, and may include the second surface 602.

The protruding portion 65 may be disposed on the first to fourth inner side surfaces 511a to 511d of the seating portion 500, and may be disposed so as to surround the side surface of the filter 610.

The filter and the holder may collide with each other due to impacts applied to the camera module, and thus the filter may crack.

The holder 600 may include a first inclined surface 607 and a second inclined surface 609 positioned between the lower surface 505a and the bottom surface 512 of the seating portion 500.

The first inclined surface 607 may be contiguous with the bottom surface 512 of the seating portion 500, and may be an inclined surface that is inclined downwards from the bottom surface 512. For example, the internal angle formed by the first inclined surface 607 of the holder 600 and the bottom surface 512 may be an obtuse angle. For example, the first inclined surface 607 may be a tapered surface. Due to the first inclined surface 607, it is possible to suppress cracking in the event of a collision between the lower surface of the filter 610 and the seating portion 500 of the holder 600.

The second inclined surface 609 may be contiguous with the lower surface 505a of the holder 600, and may be an inclined surface that is inclined upwards from the lower surface 505a of the holder 600. For example, the internal angle formed by the second inclined surface 609 of the holder 600 and the lower surface 505a of the holder 600 may be an obtuse angle.

In addition, the holder 600 may further include a third inclined surface 608 connecting the first inclined surface 607 and the second inclined surface 609. For example, the third inclined surface 608 may be oriented at a right angle relative to the bottom surface 512, without being limited thereto. In another embodiment, the angle at which the third inclined surface 608 is inclined with respect to the bottom surface 512 may be an obtuse angle or an acute angle.

Figure 13:
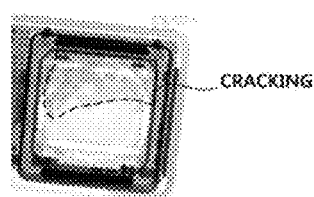
FIG. 13 shows an X-ray image of a crack formed in a filter of a camera module during a drop test.

FIG. 13 shows an X-ray image of a crack formed in the filter of the camera module during a drop test.

Referring to FIG. 13, in a drop test performed on the camera module, the camera module is warped or bent in the longitudinal direction thereof, which may cause a collision between the holder and the filter and cracking of the filter due to the collision. In particular, the filter may crack in the event of a collision between the upper surface of the filter or the upper portion of the side surface thereof and the side surface of the holder.

In order to prevent cracking of the filter, the filter disposed in the seating portion of the holder is disposed so as to be spaced apart from the inner side surface of the seating portion by a predetermined distance, for example, 0.07 mm to 0.12 mm.

However, if the spacing distance between the filter and the inner side surface of the seating portion of the holder increases, when the filter is disposed in the seating portion of the holder, the filter may shift and rotate. In general, when the filter is attached to the seating portion of the holder, a processing error may be −5 [mm] to +5 [mm]. If the spacing distance between the filter and the inner side surface of the seating portion of the holder increases, a (+) margin for attachment of the filter may become insufficient.

Due to shifting and rotation of the filter, misalignment of the filter may occur in the positional relationship or arrangement relationship with the image sensor, and a defective image may be generated in a specific pixel of the image sensor due to the misalignment of the filter. Here, the defective image may mean the state in which a specific pixel is dark compared to surrounding pixels.

Since the spacing distance D2 between the first surface 601 of the inner side surface 511 of the seating portion 500 of the holder 600 and the side surface 61 of the filter 610 is set to be greater than the spacing distance D1 between the second surface 602 of the inner side surface 511 and the side surface 61 of the filter 610 (D2>D1), the embodiment is capable of suppressing or preventing collisions between the upper surface 62 of the filter 610 or the upper portion of the side surface thereof and the first surface 601 of the holder 600 due to external impacts. In addition, the embodiment is capable of securing D1 ranging from 0.07 mm to 0.12 mm.

In addition, since the spacing distance D3 between the first surface 601 and the side surface of the blocking member 1500 is set to be greater than the spacing distance D1 between the second surface 602 of the inner side surface 511 of the seating portion 500 and the side surface 61 of the filter 610 (D3>D1), the embodiment is capable of suppressing or preventing collisions between the blocking member 1500, which is disposed on the edge of the upper surface 62 of the filter 610, and the first surface 601 of the holder 600 due to external impacts, thus preventing damage to the blocking member due to external impacts.

Since the spacing distance D1 between the second surface 602 of the inner side surface 511 of the seating portion 500 of the holder 600 and the side surface 61 of the filter 610 is set to be less than the spacing distance D2 between the first surface 601 of the inner side surface 511 of the seating portion 500 and the side surface 61 of the filter 610 (D1<D2), the embodiment is capable of suppressing or preventing shifting of the filter 610 or rotation of the filter 610 when the filter 610 is attached to the seating portion 500, thus preventing generation of a defective image in a specific pixel of the image sensor.

Figure 8:
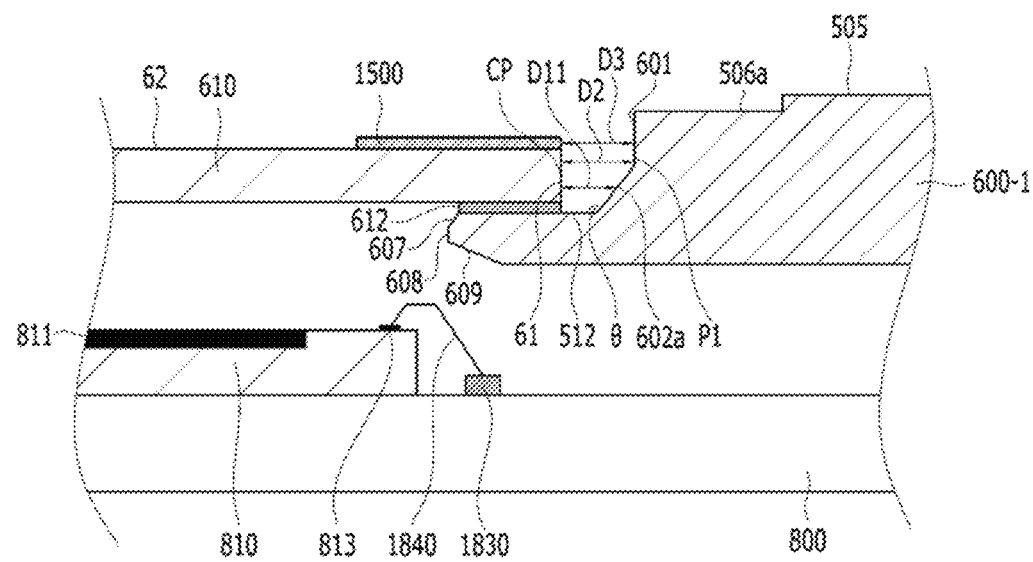
FIG. 8 shows a holder according to another embodiment.

FIG. 8 shows a holder 600-1 according to another embodiment. The same reference numerals as those in FIG. 6 denote the same components, and a description of the same components will be omitted or made briefly.

Referring to FIG. 8, the seating portion of the holder 600-1 may include a bottom surface 512 and an inner side surface, which includes a first surface 601 and a second surface 602a disposed under the first surface 601.

The first surface 601 and the second surface 602a of the holder 600-1 of FIG. 8 may be connected to each other, and the angle θ between the second surface 602a and the bottom surface 512 of the holder 600-1 may be an obtuse angle.

For example, the angle θ between the second surface 602a and the bottom surface 512 of the holder 600-1 may be 130 degrees to 170 degrees.

The second surface 602a may be a flat surface, without being limited thereto.

The portion P1 at which the first surface 601 and the second surface 602a are contiguous with each other may be positioned higher than the center point CP of the filter 610 in the optical-axis direction and lower than the upper surface 62 of the filter 610, without being limited thereto. In another embodiment, the portion P1 may be positioned at the same height as the upper surface 62 of the filter 610.

The height from the bottom surface 512 to the portion P1 may be less than the height to the lower surface of the blocking member 1500. Alternatively, in another embodiment, the height to the portion P1 may be the same as the height to the lower surface of the blocking member 1500.

The spacing distance D11 from the second surface 602a to the side surface 61 of the filter 610 may gradually increase in a direction from the lower surface of the holder 600-1 toward the upper surface of the holder 600-1.

Figure 9:
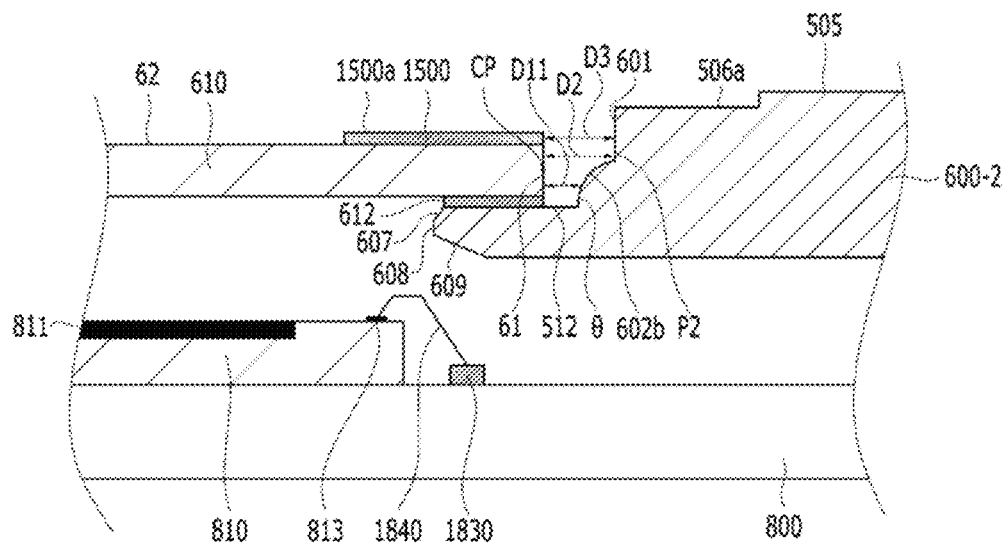
FIG. 9 shows a holder according to still another embodiment.

FIG. 9 shows a holder 600-2 according to still another embodiment. The same reference numerals as those in FIG. 6 denote the same components, and a description of the same components will be omitted or made briefly.

Referring to FIG. 9, the seating portion of the holder 600-2 may include a bottom surface 512 and an inner side surface, which includes a first surface 601 and a second surface 602b disposed under the first surface 601.

The first surface 601 and the second surface 602b of the holder 600-2 of FIG. 9 may be connected to each other, and the second surface 602b may include a convexly curved surface.

The portion P2 at which the first surface 601 and the second surface 602b are contiguous with each other may be positioned higher than the center point CP of the filter 610 in the optical-axis direction and lower than the upper surface 62 of the filter 610, without being limited thereto. In another embodiment, the portion P2 may be positioned at the same height as the upper surface 62 of the filter 610.

The height from the bottom surface 512 to the portion P2 may be less than the height to the lower surface of the blocking member 1500. Alternatively, in another embodiment, the height to the portion P2 may be the same as the height to the lower surface of the blocking member 1500.

Figure 10:
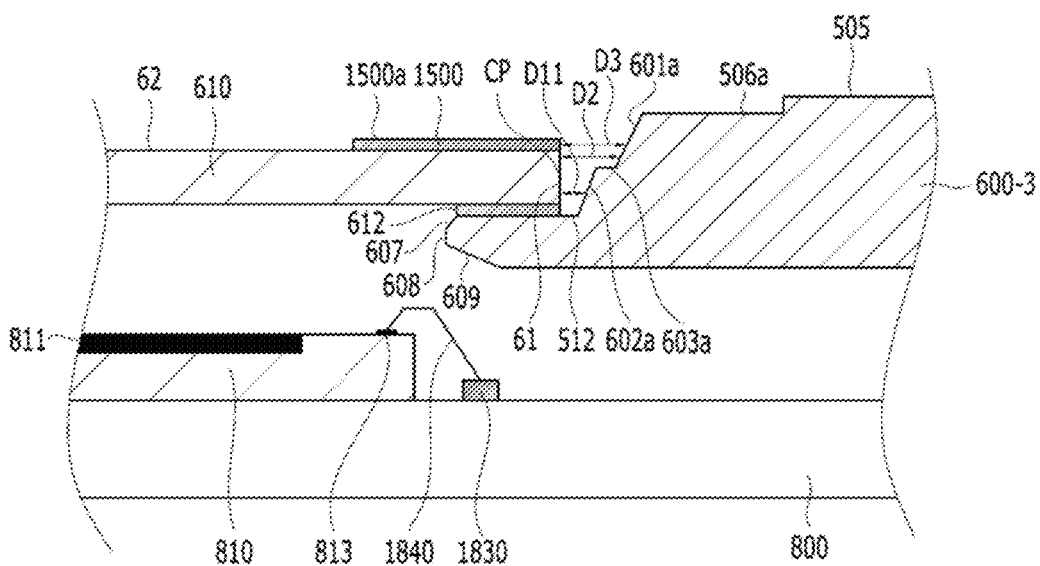
FIG. 10 shows a holder according to still another embodiment.

FIG. 10 shows a holder 600-3 according to still another embodiment. The same reference numerals as those in FIG. 6 denote the same components, and a description of the same components will be omitted or made briefly.

Referring to FIG. 10, the seating portion of the holder 600-3 may include a bottom surface 512 and an inner side surface. The inner side surface of the seating portion of the holder 600-3 may include a first surface 601a, a second surface 602a disposed under the first surface 601a, and a third surface 603a disposed between the first surface 601a and the second surface 602a to connect the first surface 601a and the second surface 602a.

Each of the angle at which the first surface 601a is inclined with respect to the bottom surface 512 and the angle at which the second surface 602a is inclined with respect to the bottom surface 512 may be an obtuse angle. Further, the third surface 603a may be a horizontal surface parallel to the bottom surface 512, without being limited thereto. In another embodiment, the third surface 603a may be an inclined surface that is inclined with respect to the bottom surface 512.

The height from the bottom surface 512 to the third surface 603a may be greater than the height to the center point CP of the filter 610 in the optical-axis direction, and may be less than the height to the upper surface 62 of the filter 610, without being limited thereto. In another embodiment, the height to the third surface 603a may be the same as the height to the upper surface 62 of the filter 610.

The height from the bottom surface 512 to the third surface 603a may be less than the height to the lower surface of the blocking member 1500. Alternatively, in another embodiment, the height to the third surface 603a may be the same as the height to the lower surface of the blocking member 1500.

D11 may gradually increase in a direction from the lower surface of the holder toward the upper surface of the holder, and the spacing distance D2 from the first surface 601a to the side surface 61 of the filter 610 may gradually increase in a direction from the lower surface of the holder 600-3 toward the upper surface of the holder 600-3.

Further, the spacing distance D3 from the first surface 601a to the side surface 61 of the blocking member 1500 may gradually increase in a direction from the lower surface of the holder 600-3 toward the upper surface of the holder 600-3.

Since each of D2 and D3 gradually increases in a direction from the lower surface of the holder 600-3 toward the upper surface of the holder 600-3, it is possible to suppress or prevent collisions between the blocking member 1500, which is disposed on the edge portion of the upper surface 62 of the filter 610, and the first surface 601 of the holder 600 due to external impacts, thus preventing damage to the filter 610 and the blocking member 1500 due to external impacts.

Figure 11:
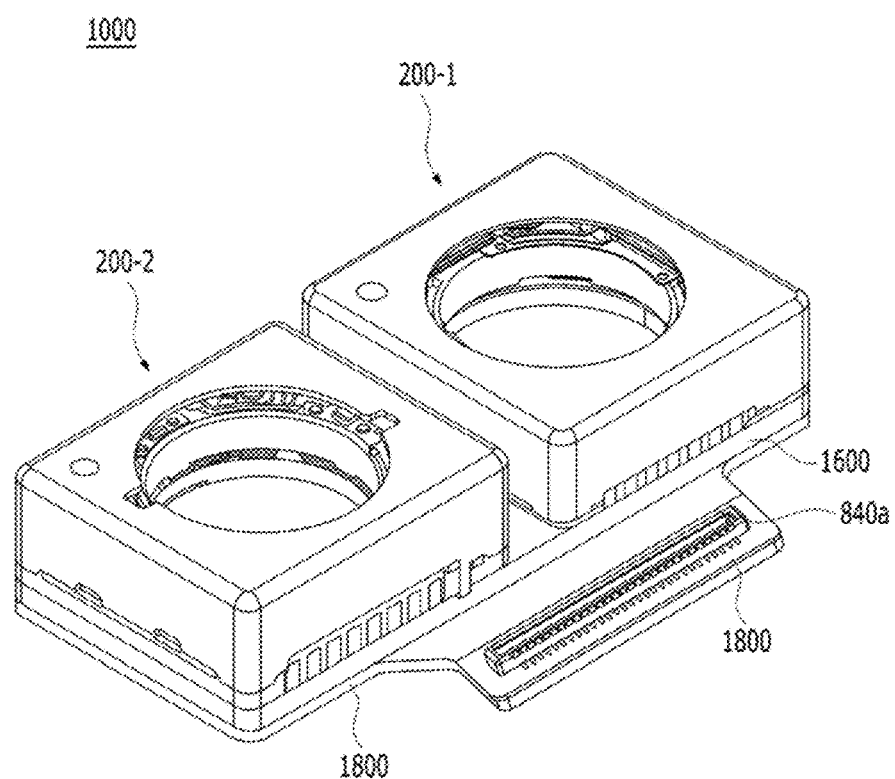
FIG. 11 is a perspective view of a camera module according to another embodiment.
Figure 12:
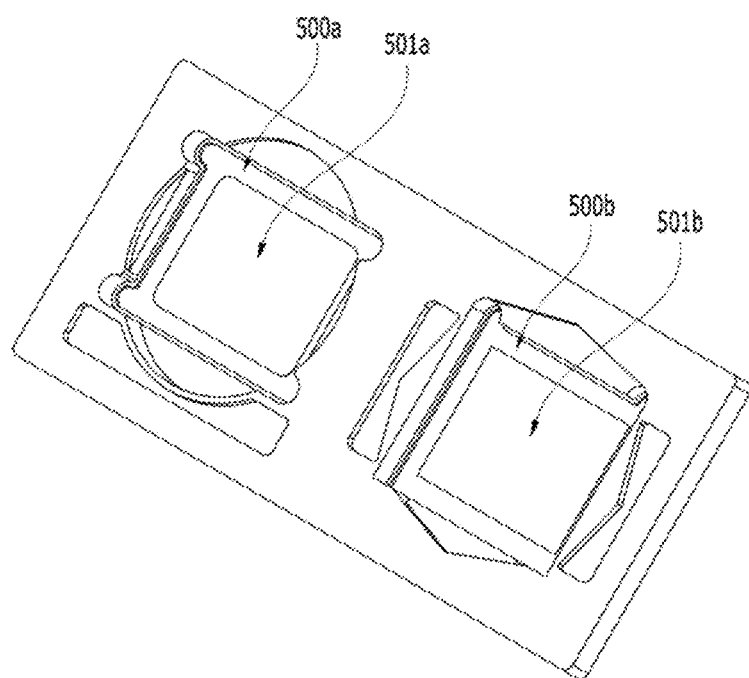
FIG. 12 is a perspective view of a holder of the camera module of FIG. 11.

FIG. 11 is a perspective view of a camera module 1000 according to another embodiment, and FIG. 12 is a perspective view of a holder 1600 of the camera module of FIG. 11.

Referring to FIG. 11, the camera module 1000 may include a first camera module 100-1 including a first lens-moving apparatus, a second camera module 200-2 including a second lens-moving apparatus, and a holder 1600.

In addition, the camera module 1000 may further include a printed circuit board 1800 on which a first image sensor of the first camera module 100-1 and a second image sensor of the second camera module 100-2 are mounted.

Although a dual camera module including two lens-moving apparatuses is illustrated in FIG. 11, the embodiment is not limited thereto. In another embodiment, a camera module including three or more lens-moving apparatuses may be used.

Each of the first camera module 200-1 and the second camera module 200-2 may be one of an autofocus (AF) camera module and an optical image stabilizer (OIS) camera module.

For example, the first camera module 200-1 may include the lens-moving apparatus 100 shown in FIG. 2, and the second camera module 200-2 may include the lens-moving apparatus 100 shown in FIG. 2, or may include an AF lens-moving apparatus.

For example, the first camera module 200-1 may include a first lens-moving apparatus, a first lens (or a first lens barrel), a first filter, and a first image sensor. For example, the second camera module 200-2 may include a second lens-moving apparatus, a second lens (or a second lens barrel), a second filter, and a second image sensor.

The holder 1600 may include a first seating portion 500a having therein a first opening 501a and a second seating portion 500b having therein a second opening 501b.

The first seating portion 500a is the portion on which the first filter of the first camera module 200-1 is disposed or seated, and the second seating portion 500b is the portion on which the second filter of the second camera module 200-2 is disposed or seated.

The first camera module 200-1 may include a first blocking member disposed on the first filter, and the second camera module 200-2 may include a second blocking member disposed on the second filter. The above description of the blocking member 1500 may apply to the first blocking member of the first camera module 200-1 and the second blocking member of the second camera module 200-2 of FIGS. 11 and 12.

The description of the arrangement, configuration, and function of the seating portion 500 of FIGS. 1 to 10 may apply to each of the first seating portion 500a and the second seating portion 500b shown in FIG. 12.

That is, the holder 1600 shown in FIGS. 11 and 12 may include two seating portions 500a and 500b that are the same as or similar to the seating portion 500 described with reference to FIGS. 1 to 10. However, the shape of the first seating portion 500a and the shape of the second seating portion 500b may be different from each other, without being limited thereto. In another embodiment, these two components may have the same shape.

For example, each of the first seating portion 500a and the second seating portion 500b may include the bottom portion and the inner side surface including the first surface and the second surface, which have been described with reference to FIGS. 1 to 10. In addition, the inner side surface of each of the first seating portion 500a and the second seating portion 500b may include the third surface described with reference to FIGS. 1 to 10. In addition, each of the first seating portion 500a and the second seating portion 500b may include the protruding portion 65 described with reference to FIGS. 1 to 10.

Although the first camera module 200-1 and the second camera module 200-2 are illustrated in FIG. 12 as being arranged side by side on one holder 1600 to share the holder 1600 with each other, the embodiment is not limited thereto. In another embodiment, the holder 1600 of the camera module 1000 may be divided into a first holder included in the first camera module and a second holder included in the second camera module. In this case, the description of the holder 600 of FIGS. 1 to 10 may equally apply to each of the first holder included in the first camera module and the second holder included in the second camera module.

Although the first image sensor of the first camera module 200-1 and the second image sensor of the second camera module 200-2 are illustrated in FIG. 11 as being arranged side by side on the printed circuit board 1800 to share the printed circuit board 1800 and to include one connector 840a, the embodiment is not limited thereto. In another embodiment, the printed circuit board 1800 may be divided into a first printed circuit board included in the first camera module and a second printed circuit board included in the second camera module, and each of the first and second printed circuit boards may include a separate connector.

Since the weight of a dual camera module or a camera module including three or more lens-moving apparatuses increases due to the lens-moving apparatuses, the holder is more likely than that of a single camera module to bend in the longitudinal direction thereof due to external impacts and/or vibration, and collisions between the filter of each camera module and the holder may occur due to the bending of the holder, which may cause cracking of the filter.

Since the camera module 1000 according to the embodiment includes a holder having two or more seating portions, which have a structure that is the same as or similar to that of the seating portion 500 described with reference to FIGS. 1 to 10, it is possible to prevent collisions between the filter and the holder due to external impacts, thus preventing cracking of the filter. In addition, the camera module 1000 according to the embodiment is capable of suppressing or preventing shifting of the filter or rotation of the filter when the filter is attached to the seating portions 500a and 500b, thus preventing the generation of defective images in specific pixels of the first and second image sensors.

Figure 14:
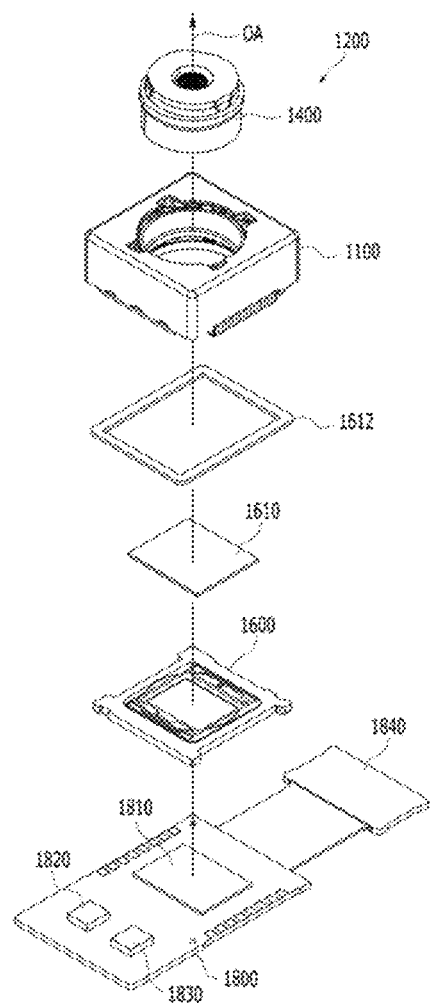
FIG. 14 is an exploded perspective view of a camera module according to an embodiment.
Figure 15A:
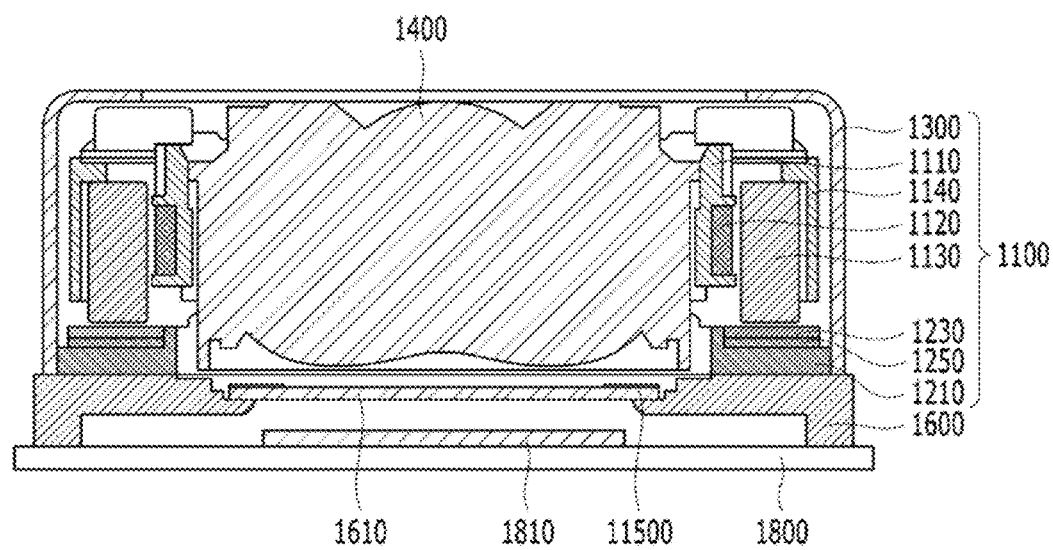
FIG. 15A is a first cross-sectional view of the camera module of FIG. 14.
Figure 15B:
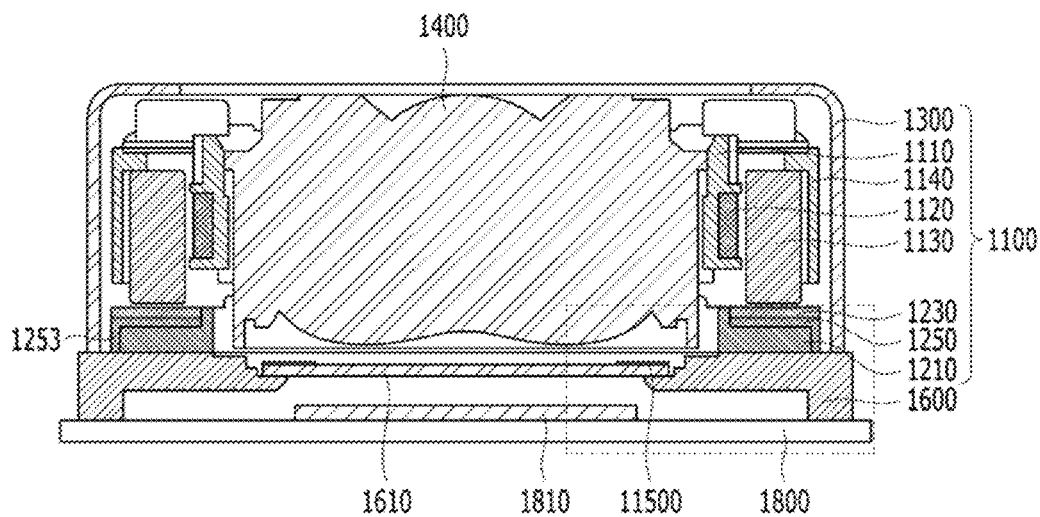
FIG. 15B is a second cross-sectional view of the camera module of FIG. 14.
Figure 16:
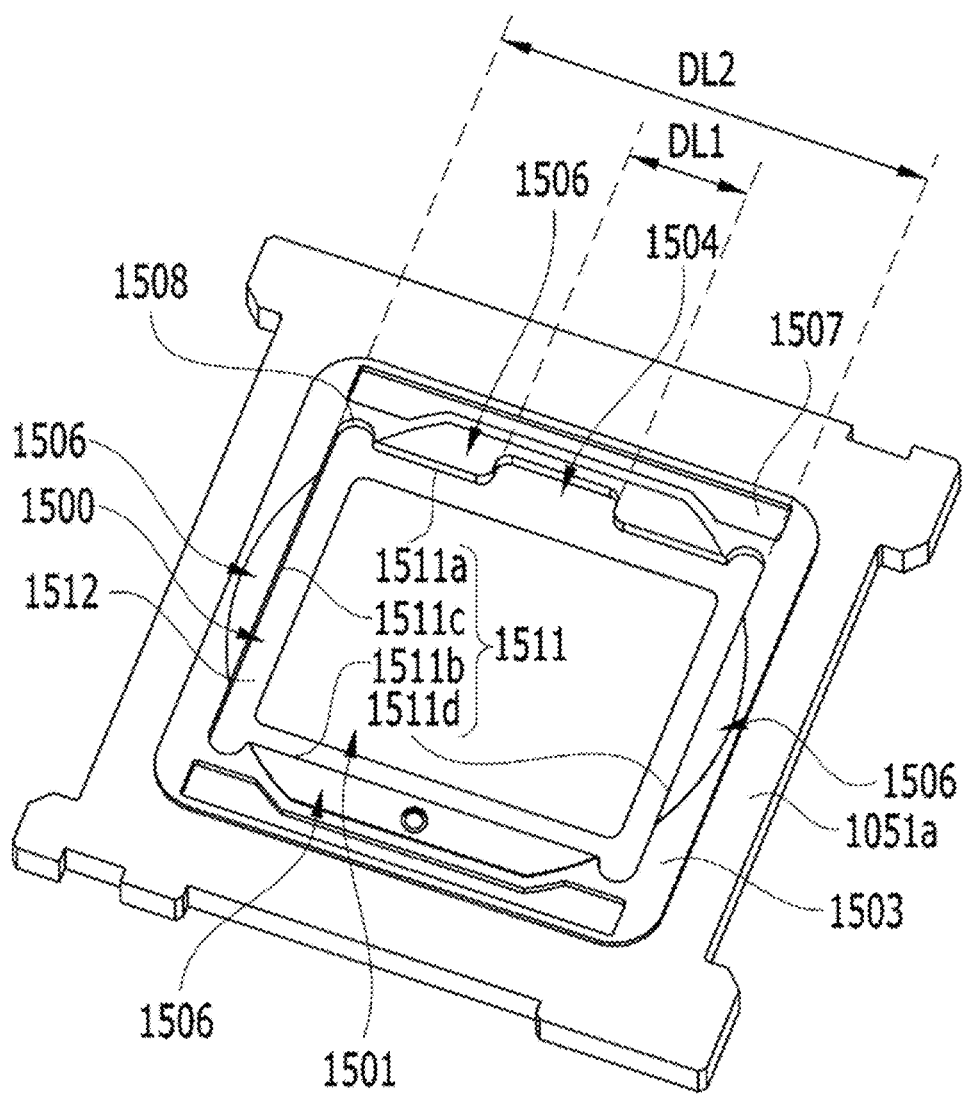
FIG. 16 is a perspective view of the holder of FIG. 14.

FIG. 14 is an exploded perspective view of a camera module 1200 according to an embodiment, FIG. 15A is a first cross-sectional view of the camera module of FIG. 14, FIG. 15B is a second cross-sectional view of the camera module of FIG. 14, and FIG. 16 is a perspective view of the holder 1600 of FIG. 14.

Referring to FIGS. 14 to 16, the camera module 1200 may include a lens or a lens barrel 1400, a lens-moving apparatus 1100, a filter 1610, a holder 1600, a first adhesive member 1310, a second adhesive member 1330, a printed circuit board 1800, and an image sensor 1810.

In addition, the camera module 1200 may further include an adhesive member 1320 disposed between the holder 1600 and the printed circuit board 1800.

In addition, the camera module 1200 may further include a blocking member 11500 disposed on the filter 1610.

In addition, the camera module 1200 may further include an adhesive member 1612 for coupling or attaching the lens-moving apparatus 1100 to the holder 1600.

In addition, the camera module 1200 may further include a motion sensor 1820, a controller 1830, and a connector 1840.

The lens or the lens barrel 1400 may be mounted to a bobbin 1110 of the lens-moving apparatus 1100.

The lens-moving apparatus 1100 may drive the lens or the lens barrel 1400, and may move the lens or the lens barrel 1400 in the optical-axis direction.

The camera module 1200 may be any one of an autofocus (AF) camera module and an optical image stabilizer (OIS) camera module. The AF camera module is a camera module configured to perform only an autofocus function, and the OIS camera module is a camera module configured to perform an autofocus function and an optical image stabilizer (OIS) function.

For example, the lens-moving apparatus 1100 may be an AF lens-moving apparatus or an OIS lens-moving apparatus, and the meanings of "AF" and "OIS" may be the same as those of the AF camera module and the OIS camera module.

For example, the lens-moving apparatus 1100 of the camera module 1200 may be an OIS lens-moving apparatus.

The lens-moving apparatus 1100 may include a housing 1140, a bobbin 1110 disposed in the housing 1140 to allow the lens or the lens barrel 1400 to be mounted thereto, a first coil 1120 disposed at the bobbin 1110, a magnet 1130 disposed in the housing 1140 so as to face the first coil 1120, at least one upper elastic member (not shown) coupled to the upper portion of the bobbin 1110 and the upper portion of the housing 1140, at least one lower elastic member (not shown) coupled to the lower portion of the bobbin 1110 and the lower portion of the housing 1140, a second coil 1230 disposed under the bobbin 1110 (and/or the housing 1140), a printed circuit board 1250 disposed under the second coil 1230, and a base 1210 disposed under the printed circuit board 1250.

In addition, the lens-moving apparatus 1100 may further include a cover member 1300 coupled to the base 1210 to provide space for accommodating the components of the lens-moving apparatus 1100 together with the base 1210.

In addition, the lens-moving apparatus 1100 may further include a support member (not shown) electrically connecting the printed circuit board 1250 to the upper elastic member and supporting the housing 1140 with respect to the base 1210. Each of the first coil 1120 and the second coil 1230 may be electrically connected to the printed circuit board 1250, and may receive a driving signal (driving current) from the printed circuit board 1250.

For example, the upper elastic member may include a plurality of upper springs, the support member may include support members connected to the upper springs, and the first coil 1120 may be electrically connected to the printed circuit board 1250 via the upper springs and the support member. The printed circuit board 1250 may include a plurality of terminals, and some of the plurality of terminals may be electrically connected to the first coil 1120 and/or the second coil 1230.

The bobbin 1110 and the lens or the lens barrel 1400 coupled thereto may be moved in the optical-axis direction due to the electromagnetic force generated by interaction between the first coil 1120 and the magnet 1130, and accordingly, the displacement of the bobbin 1110 in the optical-axis direction may be controlled, whereby an AF operation may be implemented.

In addition, the housing 1140 may be moved in a direction perpendicular to the optical axis due to the electromagnetic force generated by interaction between the second coil 1230 and the magnet 1130, and accordingly, a hand tremor compensation or OIS operation may be implemented.

In addition, in order to implement an AF feedback operation, the lens-moving apparatus 1100 of the camera module 1200 may further include a sensing magnet (not shown) disposed at the bobbin 1110 and an AF position sensor (e.g. a hall sensor) (not shown) disposed in the housing 1140. In addition, the lens-moving apparatus 1100 may further include a printed circuit board (not shown) disposed in the housing and/or on the base to allow the AF position sensor to be disposed or mounted thereon. In another embodiment, the AF position sensor may be disposed at the bobbin, and the sensing magnet may be disposed in the housing. In addition, the lens-moving apparatus 1100 may further include a balancing magnet disposed at the bobbin 1110 so as to correspond to the sensing magnet.

The AF position sensor may output an output signal according to the result of detection of the magnitude of the magnetic field of the sensing magnet upon movement of the bobbin 1100. The AF position sensor may be electrically connected to the printed circuit board 1250 via the upper elastic member (or the lower elastic member) and/or the support member. The printed circuit board 1250 may provide a driving signal to the AF position sensor, the output of the AF position sensor may be transmitted to the printed circuit board 1250, and the controller 1830 may sense or detect the displacement of the bobbin 1110 using the output of the AF position sensor.

In another embodiment, the lens-moving apparatus 1100 may be an AF lens-moving apparatus, and the AF lens-moving apparatus may include a housing, a bobbin disposed in the housing, a coil disposed at the bobbin, a magnet disposed in the housing, at least one elastic member coupled to the bobbin and the housing, and a base disposed under the bobbin (and/or the housing). For example, the elastic member may include the upper elastic member and the lower elastic member described above.

A driving signal (e.g. driving current) may be provided to the coil, and the bobbin may be moved in the optical-axis direction due to the electromagnetic force generated by interaction between the coil and the magnet. In another embodiment, the coil may be disposed in the housing, and the magnet may be disposed at the bobbin.

In addition, in order to implement an AF feedback operation, the AF lens-moving apparatus may further include a sensing magnet disposed at the bobbin, an AF position sensor (e.g. a hall sensor) disposed in the housing, and a printed circuit board disposed or mounted in the housing and/or on the base to allow the AF position sensor to be mounted thereon. In another embodiment, the AF position sensor may be disposed at the bobbin, and the sensing magnet may be disposed in the housing.

The printed circuit board may be electrically connected to the coil and the AF position sensor, a driving signal may be provided to each of the coil and the AF position sensor through the printed circuit board, and the output of the AF position sensor may be transmitted to the printed circuit board.

The camera module according to another embodiment may include, instead of the lens-moving apparatus 1100 of FIG. 14, a housing coupled to the lens or the lens barrel 1400 to fix the lens or the lens barrel 1400, and the housing may be coupled or attached to the upper surface of the holder 1600. The housing attached or fixed to the holder 1600 may not be moved, and the position of the housing may be fixed in the state in which the housing is attached to the holder 1600.

The holder 1600 may be disposed under the base 1210 of the lens-moving apparatus 1100.

For example, the holder 1600 may be disposed under the lens or the lens barrel 1400.

The holder 1600 may include a seating portion 1500, which is recessed from the upper surface thereof and on which the filter 1610 is seated. The filter 1610 may be disposed in the seating portion 1500.

The adhesive member 1612 may couple or attach the base 1210 of the lens-moving apparatus 1100 to the holder 1600. For example, the adhesive member 1612 may be disposed between the lower surface of the base 1210 and the upper surface of the holder 1600, and may bond these two components to each other.

The adhesive member 1612 may serve not only to bond components, as described above, but also to prevent foreign substances from entering the lens-moving apparatus 1100. For example, the adhesive member 1612 may be an epoxy, a thermosetting adhesive, or an ultraviolet curable adhesive.

The holder 1600 may have an opening 1501 formed in the region thereof in which the filter 1610 is mounted or disposed so that light passing through the filter 1610 enters the image sensor 1810.

For example, the opening 1501 may penetrate the holder 1600 in the optical-axis direction, and may be referred to as a "through-hole".

For example, the opening 1501 may penetrate the center of the holder 1600, and may be disposed so as to correspond to or face the image sensor 1810 (e.g. an active area of the image sensor 1810).

The holder 1600 may be disposed on the printed circuit board 1800, and may support the lens-moving apparatus 1100 positioned thereon. For example, the lower surface of the base 1210 of the lens-moving apparatus 1100 may be disposed on the upper surface of the holder 1600.

For example, the lower surface of the base 1210 of the lens-moving apparatus 1100 may be in contact with the upper surface of the holder 1600, and may be supported by the upper surface of the holder 1600.

The filter 1610 may serve to block light in a specific frequency band, among the light passing through the lens barrel 1400, from entering the image sensor 1810.

For example, the filter 1610 may be an infrared cut-off filter, without being limited thereto. In another embodiment, the filter may be an infrared pass filter. For example, the filter 1610 may be disposed parallel to the x-y plane, which is perpendicular to the optical axis OA.

The filter 1610 may be attached to the bottom surface 1512 of the seating portion 1500 of the holder 1600 using adhesive members 1310 and 1330. Here, the adhesive members 1310 and 1330 may be an epoxy, a thermosetting adhesive, or an ultraviolet curable adhesive.

The printed circuit board 1800 may be disposed under the holder 1600, and the image sensor 1810 may be disposed on the upper surface of the printed circuit board 1800.

The holder 1600 may be attached or fixed to the upper surface of the printed circuit board 1800 using an adhesive member 1320 such as an epoxy, a thermosetting adhesive, or an ultraviolet curable adhesive. In this case, the adhesive member 1320 may be disposed between the lower surface of the holder 1600 and the upper surface of the printed circuit board 1800.

The image sensor 1810 may be a part on which the light that has passed through the filter 1610 is incident and in which an image included in the light is formed.

The printed circuit board 1800 may be provided with various circuits, elements, and controllers in order to convert an image formed by the image sensor 1810 into an electrical signal and to transmit the electrical signal to an external device.

A circuit pattern, which is electrically connected to the image sensor and various elements, may be formed on the printed circuit board 1800.

The filter 1610 and the image sensor 1810 (e.g. the active area of the image sensor 1810) may be disposed so as to be spaced apart from each other and to face each other in the optical-axis (OA) direction or the first direction.

The motion sensor 1820 may be mounted or disposed on the printed circuit board 1800, and may be electrically connected to the controller 1830 via a circuit pattern provided on the printed circuit board 1800.

The motion sensor 1820 outputs rotating angular speed information according to the motion of the camera module 1200.

The motion sensor 1820 may be implemented as a 2- or 3-axis gyro sensor or an angular speed sensor.

The controller 1830 is mounted or disposed on the printed circuit board 1800.

The printed circuit board 1800 may be electrically connected to the lens-moving apparatus 1100. For example, the printed circuit board 1800 may be electrically connected to the printed circuit board 1250 of the lens-moving apparatus 1100.

For example, a driving signal may be provided to each of the first coil 1120 and the second coil 1230 of the lens-moving apparatus 1100 through the printed circuit board 1800, and a driving signal may be provided to the AF position sensor (or the OIS position sensor). Further, the output of the AF position sensor (and/or the OIS position sensor) may be transmitted to the printed circuit board 1800.

The connector 1840 may be electrically connected to the printed circuit board 1800, and may include a port to be electrically connected to an external device. For example, the connector 1840 may be electrically connected to the printed circuit board 1800 via a connection substrate.

Although not shown in FIG. 14, the embodiment may further include a stiffener disposed under the printed circuit board 1800. The stiffener is a plate-type member having a predetermined thickness and hardness, and may stably support the printed circuit board 1800 and prevent damage to the printed circuit board due to an external impact or contact. In addition, the stiffener may improve a heat dissipation effect of dissipating the heat generated from the image sensor to the outside.

For example, the stiffener may be formed of a metal material having high thermal conductivity, such as SUS or aluminum, without being limited thereto. In another embodiment, the stiffener may be formed of glass epoxy, plastic, or synthetic resin.

In the embodiment including the stiffener, the printed circuit board 1800 may include therein an opening for exposing the image sensor 1810, and the image sensor 1810 may be disposed on the upper surface of the stiffener.

In addition, the stiffener may be electrically connected to a ground terminal of the printed circuit board 1800, and thus may serve as a ground for protecting the camera module from electrostatic discharge (ESD).

The blocking member 11500 may be disposed on the upper surface of the filter 1610. The blocking member 11500 may be referred to as a "masking part".

For example, the blocking member 11500 may be disposed on the edge portion of the upper surface of the filter 1610, and may serve to block at least a portion of the light traveling toward the edge portion of the filter 1610 through the lens or the lens barrel 1400 from passing through the filter 1610. For example, the blocking member 11500 may be coupled or attached to the upper surface of the filter 1610 using an adhesive member.

For example, the filter 1610 may be formed in a rectangular shape when viewed in the optical-axis direction, and the blocking member 11500 may be formed to be symmetrical with respect to the filter 1610 along each side of the upper surface of the filter 1610.

In this case, the blocking member 11500 may be formed to have a predetermined width on each side of the upper surface of the filter 1610.

The blocking member 11500 may be formed of an opaque material. For example, the blocking member 11500 may be an opaque and adhesive material that is applied to the filter 1610, or may be provided in the form of a film that is attached to the filter 1610.

The filter 1610 and the active area of the image sensor 1810 may be disposed so as to face or overlap each other in the optical-axis direction, and the blocking member 11500 may not overlap the active area or the sensing pixel area of the image sensor 1810 in the optical-axis direction. Further, at least a portion of the blocking member 11500 may overlap the terminal 1830 and/or the wire disposed on the printed circuit board 1800 in the optical-axis direction.

The image sensor 1810 may be electrically connected to the terminal of the printed circuit board 1800 via a wire. The wire and the terminal may be formed of a conductive material such as gold, silver, copper, or a copper alloy, and this conductive material may have a property of reflecting light. The light that has passed through the filter 1610 may be reflected by the terminal 1830 of the printed circuit board 1800 and the wire, and an instantaneous flash, i.e. a flare phenomenon, may occur due to this reflected light. Such a flare phenomenon may distort the image formed by the image sensor 1810 or may deteriorate the quality of the image.

Since the blocking member 11500 is disposed such that at least a portion thereof overlaps the terminal of the printed circuit board 1800 and/or the wire in the optical-axis direction, the blocking member 11500 may block the light traveling toward the terminal of the printed circuit board 1800 and/or the wire, among the light that has passed through the lens or the lens barrel 1400, thereby preventing the occurrence of the aforementioned flare phenomenon, thus preventing distortion of the image formed by the image sensor 1810 and deterioration in the quality of the image.

Referring to FIG. 16, the seating portion 1500 may be formed in the shape of a recess, a cavity, or a hole, which is concavely formed in the upper surface 1051*a* of the holder 1600, without being limited thereto.

The seating portion 1500 of the holder 1600 may include an inner side surface 1511 and a bottom surface 1512, and the filter 1610 may be disposed on the bottom surface 1512 of the seating portion 1500 of the holder 1600.

For example, the opening 1501 may be formed in the bottom surface 1512 of the seating portion 1500, and may be spaced apart from the inner side surface 1511 of the seating portion 1500.

The area of the opening 1501 may be smaller than the area of the filter 1610 defined by the horizontal length and the vertical length thereof so that the filter 1610 may be disposed on the bottom surface 1512 of the seating portion 1500 of the holder 1600.

The inner side surface 1511 of the seating part 1500 of the holder 1600 may correspond to or face the side surface of the filter 1610.

The inner side surface 1511 of the seating portion 1500 may include a first inner side surface 1511*a*, a second inner side surface 1511*b*, a third inner side surface 1511*c*, and a fourth inner side surface 1511*d*.

The first inner side surface 1511*a* and the second inner side surface 1511*b* may face each other, and the third inner side surface 1511*c* and the fourth inner side surface 1511*d* may face each other.

The third inner side surface 1511*c* may connect one end of the first inner side surface 1511*a* and one end of the second inner side surface 1511*b* to each other, and the fourth inner side surface 1511*d* may connect the opposite end of the first inner side surface 1511*a* and the opposite end of the second inner side surface 1511*b* to each other.

The holder 1600 may include a protruding portion 1503 disposed around the seating portion 1500 and protruding from the upper surface 1051*a* of the holder 1600.

For example, the protruding portion 1503 may have a structure protruding along the inner side surface 1511 of the seating portion 1500 in the optical-axis direction. The shape of the protruding portion 1503 may be the same as or similar to the shape of the seating portion 1500 (e.g. a rectangular shape), without being limited thereto.

Further, the upper surface of the protruding portion 1503 may be positioned higher than the upper surface of the filter 1610 in the optical-axis direction, without being limited thereto. In another embodiment, the upper surface of the protruding portion 1503 may positioned lower than the upper surface of the filter 1610.

The holder 1600 may further include a stopper 1506 disposed adjacent to the seating portion 1500 and protruding from the upper surface of the protruding portion 1503 in the optical-axis direction. The stopper 1506 may have a protrusion shape, without being limited thereto. In another embodiment, the stopper 1506 may be formed in the shape of a groove recessed from the upper surface of the protruding portion 1503.

For example, the stopper 1506 may be connected to or contiguous with the inner side surface 1511 of the seating portion 1500, without being limited thereto. In another embodiment, the stopper 1506 may be spaced apart from the inner side surface 1511 of the seating portion 1500.

The upper surface of the stopper 1506 may be positioned higher than the upper surface of the filter 1610, which is disposed on the seating portion 1500, in the optical-axis direction on the basis of the bottom surface 1512 of the seating portion 1500. In the case in which the stopper 1506 is formed in a groove shape, the bottom surface of the stopper 1506 may be positioned higher than the upper surface of the filter 1610, which is disposed on the seating portion 1500, in the optical-axis direction on the basis of the bottom surface 1512 of the seating portion 1500.

The lower end of the lens or the lens barrel 1400, which is moved in the optical-axis direction by the AF operation, may come into contact with the upper surface of the stopper 1506, but may be prevented from moving below the stopper 1506 by the stopper 1506.

The stopper 1506 may prevent spatial interference between the lower end of the lens or the lens barrel 1400 mounted to the lens-moving apparatus 1100 and the upper surface of the filter 1610. That is, during the AF operation, collisions between the lens or the lens holder 400 of the lens-moving apparatus 1100 and the upper surface of the filter 1610 may be prevented by the stopper 1506.

Referring to FIG. 16, the holder 1600 may include four stoppers corresponding to the first to fourth inner side surfaces, without being limited thereto. In another embodiment, two or more stoppers or one stopper may be provided.

For example, the stopper 1506 may be disposed adjacent to a corresponding one of the first to fourth inner side surfaces 1511*a* to 1511*d* of the seating portion 1500, without being limited thereto. In another embodiment, the stopper may be disposed corresponding to at least one of the first to fourth inner side surfaces 1511*a* to 1511*d* of the seating portion 1500.

For example, the stopper 1506 may be contiguous with a corresponding one of the first to fourth inner side surfaces 1511*a* to 1511*d* of the seating portion 1500. For example, the stopper 1506 may be disposed in the center area of a corresponding inner side surface.

For example, the overall shape of the stopper 1506 may match the shape of the lens or the lens barrel.

The holder 1600 may include a foreign-substance-collecting portion 1507, which is formed in the shape of a groove recessed from the upper surface 1051*a*. The foreign-substance-collecting portion 1507 may be disposed adjacent to the stopper 1506, without being limited thereto. For example, the foreign-substance-collecting portion 1507 may be positioned outside the stopper 1506 on the basis of the seating portion 1500, without being limited thereto.

The foreign-substance-collecting portion 1507 may collect foreign substances introduced from the lens-moving apparatus 1100. The foreign-substance-collecting portion 1507 may be referred to as a dust trapper. Referring to FIG. 16, the holder 1600 may include two foreign-substance-collecting portions 1507, without being limited thereto. In another embodiment, one or three or more foreign-substance-collecting portions may be provided.

In addition, the holder 1600 may include a concave portion 1508 disposed at a corner region of the inner side surface 1511 of the seating portion 1500. The concave portion 1508 may have a structure that is recessed in a direction from the center of the opening 1501 in the seating portion 1500 toward the corner region of the inner side surface 1511 of the seating portion 1500. The concave portion 1508 may prevent an adhesive member, such as UV epoxy, for attaching the filter 1610 to the seating portion 1500 from overflowing out of the seating portion 1500.

The holder 1600 may include a groove portion 1504, which is formed in the inner side surface 1511 of the seating portion 1500. The groove portion 1504 may be formed in an inner side surface (e.g. 1511*a*) positioned between two adjacent corners of the seating portion 1500. Here, the groove portion 1504 may be referred to as a "concave portion" or a "groove".

The groove portion 1504 may be positioned at the center of one (e.g. 511*a*) of the first to fourth inner side surfaces 1511*a* to 1511*d* of the seating portion 1500.

For example, the inner side surface 1511 of the seating portion 1500 may include a first inner side surface 1511*a* facing the first side surface of the filter 1610, and the groove portion 1504 in the seating portion 1500 may be formed in the first inner side surface 1511*a*, and may be recessed from the first inner side surface 1511*a* in a direction from the first side surface of the filter 1610 toward the first inner side surface 1511*a*.

For example, the groove portion 1504 in the seating portion 1500 may be concavely formed in the first inner side surface 1511*a* in a direction from the first side surface of the filter 1610 toward the first inner side surface 1511*a*.

For example, the groove portion 1504 in the seating portion 1500 may be open to the upper surface of the holder 1600, and may be connected to the bottom surface 1512 of the seating portion 1500. Further, for example, the groove portion 1504 in the seating portion 1500 may have therein an opening that opens toward the filter 1610.

Further, for example, the bottom surface of the groove portion 1504 may be coplanar with the bottom surface 1512 of the seating portion 1500. The reason of this is to allow the second adhesive member 1330 to smoothly enter the space between the lower surface of the filter 1610 and the bottom surface 1512 of the seating portion 1500. However, in another embodiment, the bottom surface of the groove portion 1504 may not be coplanar with the bottom surface 1512 of the seating portion 1500.

The groove portion 1504 may not overlap the filter 1610, disposed in the seating portion 1500, in the optical-axis direction.

For example, the groove portion 1504 may be formed in a region of the stopper 504 of the holder 1600. Referring to FIG. 3, the groove portion 1504 may be formed in the stopper 1506 adjacent to the first inner side surface 1511*a* of the seating portion 1500, without being limited thereto.

In another embodiment, the groove portion 1504 may be formed in the inner side surface of the seating portion 1500 in which a stopper is not provided.

The ratio (DL1:DL2) of the length DL1 of the groove portion 1504 in the longitudinal direction of the inner side surface 1511*a* (or the transverse direction of the inner side surface 1511*a*) of the seating portion 1500 to the length DL2 of the inner side surface 1511*a* of the seating portion 1500 may be 1:3 to 1:4.

For example, if the value obtained by dividing DL2 by DL1 (DL2/DL1) is less than 3, the length DL1 of the groove portion 1504 may be excessive, and thus the amount of the second adhesive member 1330 charged into the groove portion 1504 may increase. In the case in which the groove portion 1504 is formed in the stopper 1506, when the length of the groove portion 1504 increases, the contact area of the stopper 1506 with the lens barrel 1400 may decrease, and thus the stopper may not stably stop the movement of the lens or the lens barrel, and may exhibit reduced strength or durability.

If the value obtained by dividing DL2 by DL1 (DL2/DL1) is greater than 4, the length DL1 of the groove portion 1504 is so small that the second adhesive member 1330 may not smoothly fill the gap between the filter 1610 and the bottom surface 1512 of the seating portion 1500 of the holder 1600, whereby the opening 1504 in the first adhesive member 1310 may not be sealed.

Further, for example, the length DL1 of the groove portion 1504 may be constant, without being limited thereto. In another embodiment, the length DL1 of the groove portion 1504 may gradually increase in a direction from the groove portion 1504 toward the side surface of the filter 1610 facing the groove portion 1504. The reason for this is to allow the second adhesive member 1330 to smoothly fill the gap between the filter 1610 and the bottom surface 1512 of the seating portion 1500 of the holder 1600.

Figure 18:
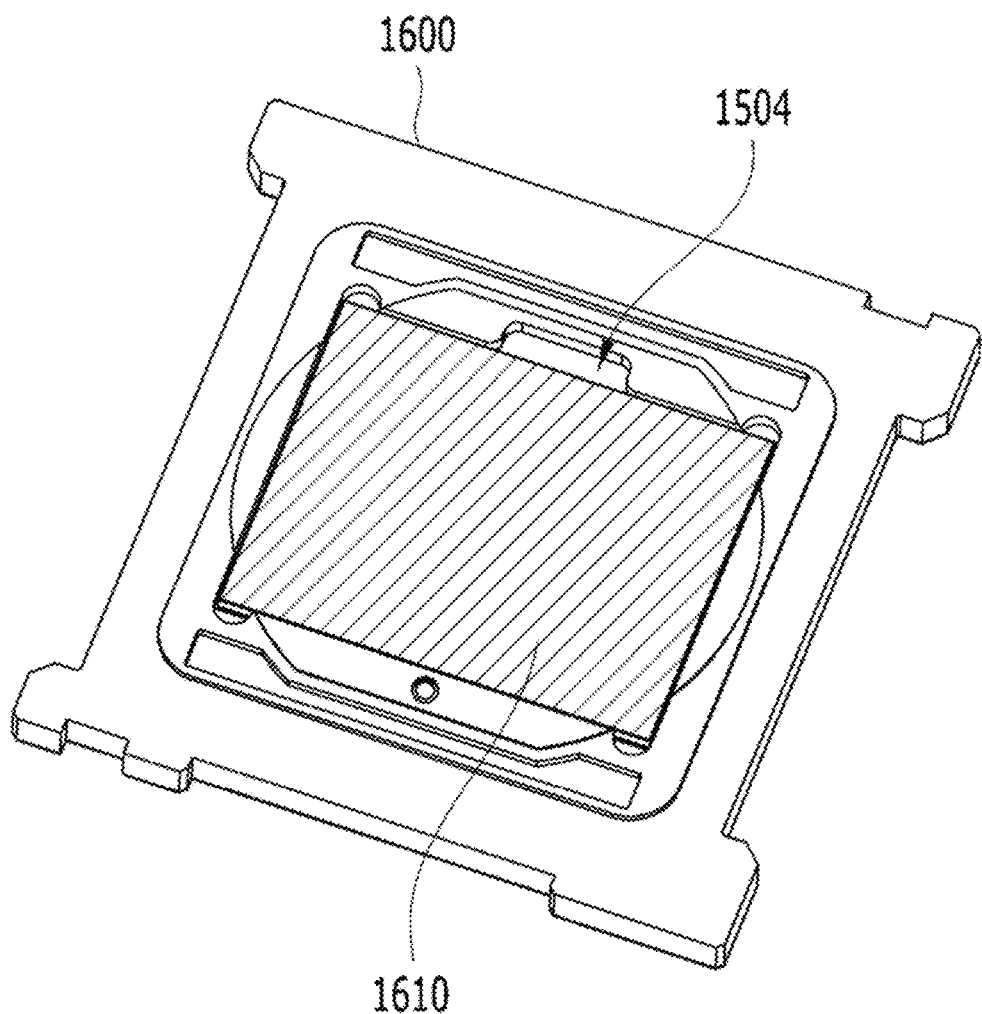
Figure 19:
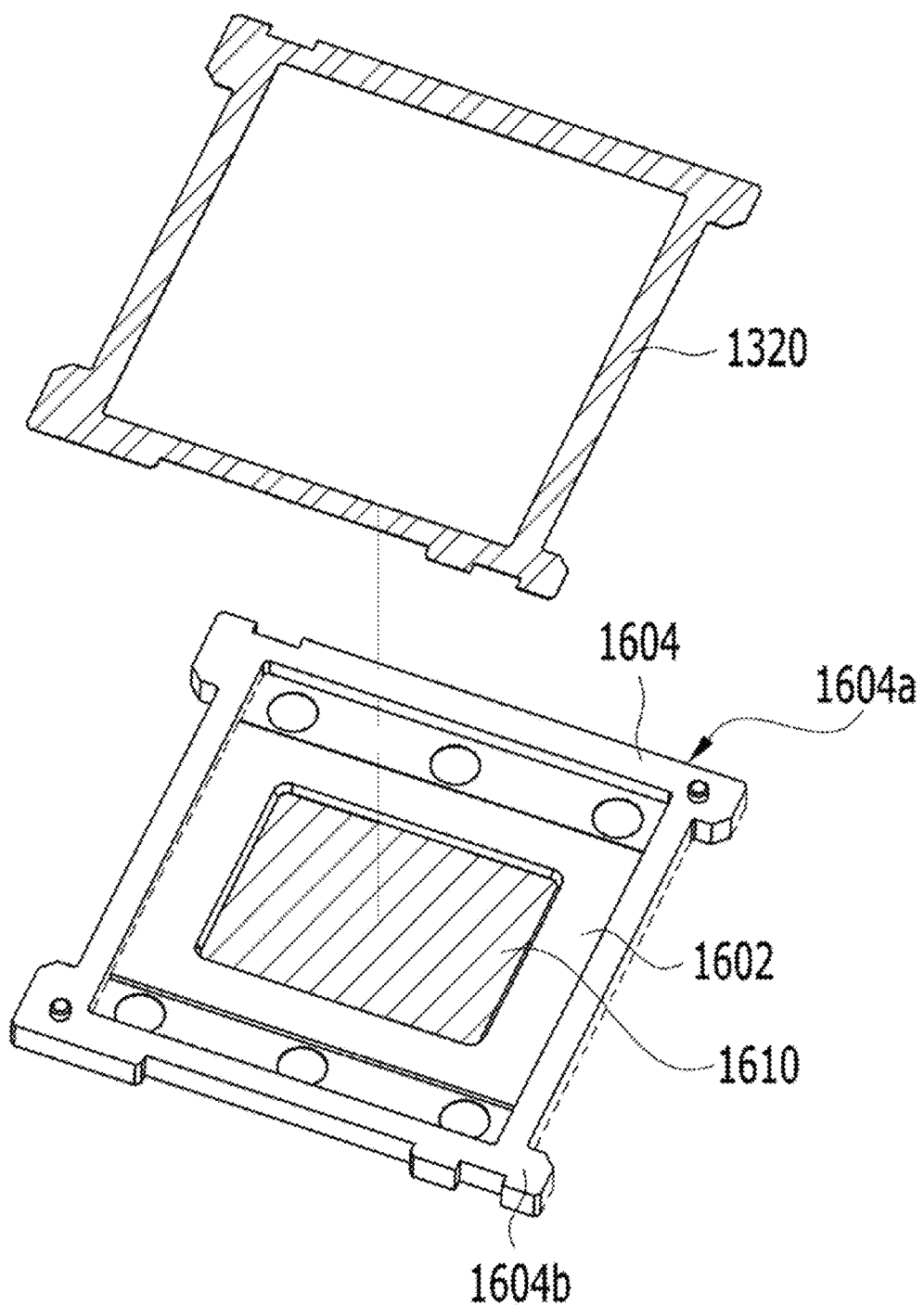
Figure 20:
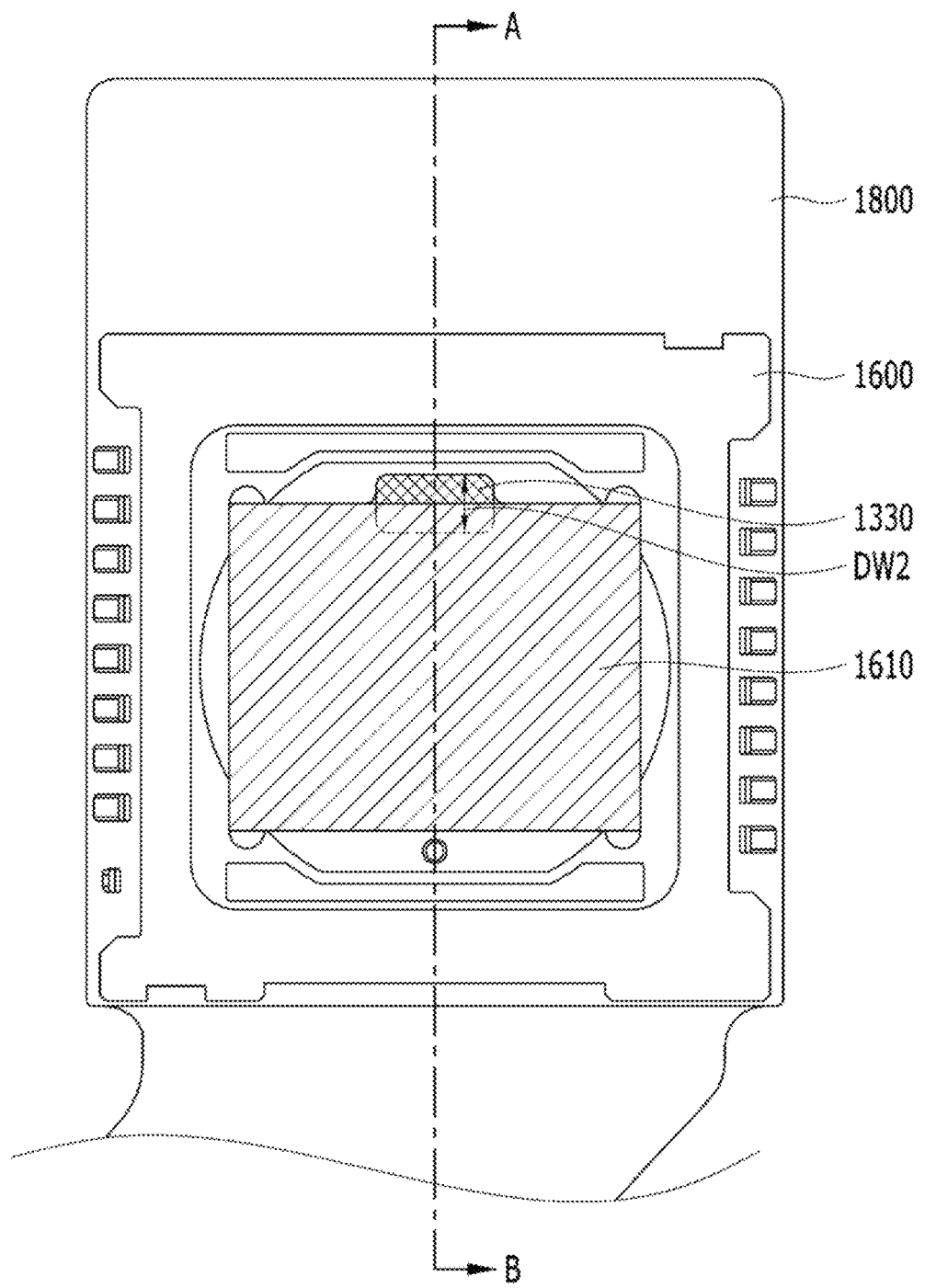
Figure 21:
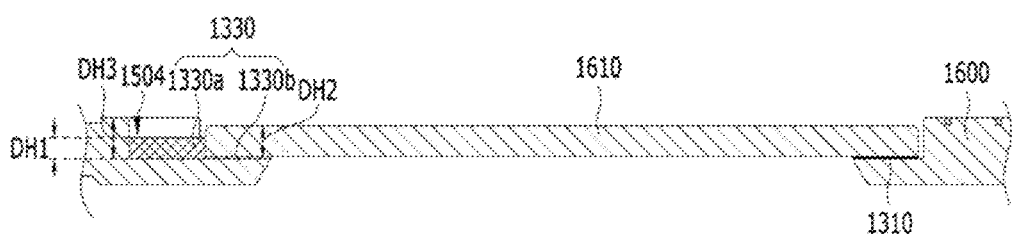
FIG. 21 is a partial enlarged view of the cross-section taken in the direction AB in FIG. 20.
Figure 22:
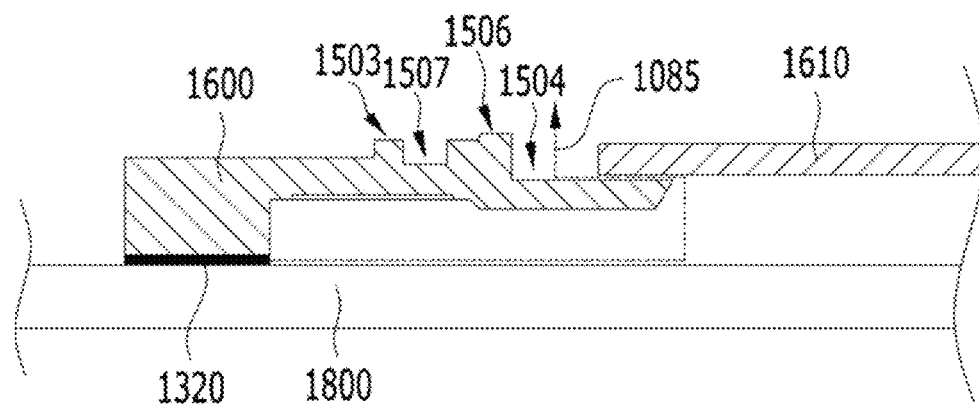
FIG. 22 is a partial enlarged view of the cross-sectional view of FIG. 20 before a second adhesive member is formed after the attachment of a holder and a printed circuit board.

FIGS. 17 to 20 show an order in which the holder 1600, the filter 1610, and the printed circuit board 1800 according to the embodiment are coupled, FIG. 21 is a partial enlarged view of the cross-section taken in the direction AB in FIG. 20, and FIG. 22 is a partial enlarged view of the cross-sectional view of FIG. 20 before the second adhesive member 1320 is formed after the attachment of the holder 1600 and the printed circuit board 1800.

The first adhesive member 1310 may be disposed between the bottom surface 1512 of the seating portion 1500 and the lower surface of the filter 1610, and may include therein an opening 1054, at least a portion of which corresponds to the groove portion 1504.

Figure 17:
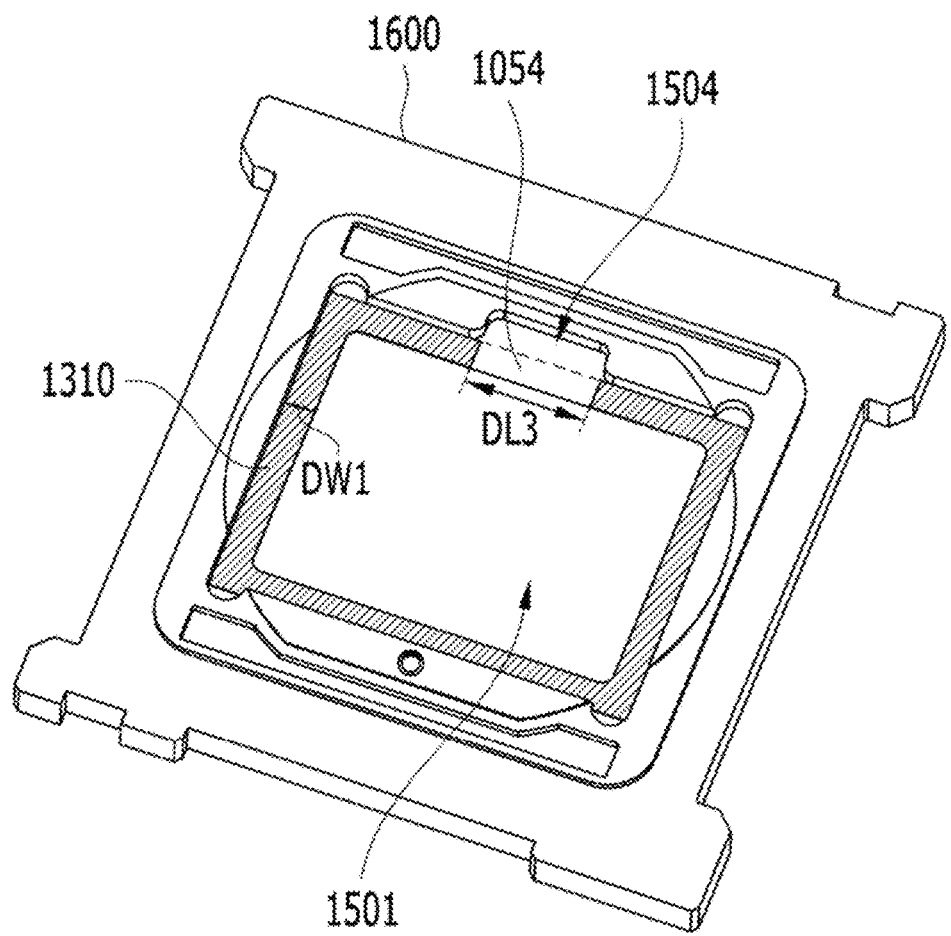
FIGS. 17 to 20 show an order in which a holder, a filter, and a printed circuit board according to an embodiment are coupled.

Referring to FIG. 17, the first adhesive member 1310 may be formed on the bottom surface 1512 of the seating portion 1500. The first adhesive member 1310 may be disposed so as to have a predetermined width DW1 within a predetermined region from the inner side surface 1511 of the seating portion 1500.

For example, the first adhesive member 1310 may be formed by applying an adhesive (e.g. UV epoxy) to the bottom surface 1512 of the seating portion 1500.

The first adhesive member 1310 may have therein an opening 1054 or an open region at a position corresponding to the groove portion 1504 in the holder 1600. Here, the opening 1054 may serve as an air vent for discharging fumes generated when the second adhesive member 1330 is cured, which will be described later.

The opening 1054 in the first adhesive member 1310 may be the region corresponding to the groove portion 1504 in the bottom surface 1512 of the seating portion 1500, and may be the region to which an adhesive for forming the first adhesive member 1310 is not applied.

For example, the first adhesive member 1310 may have therein an opening 1054, which is a cut portion corresponding to the groove portion 1504. For example, the portion of the first adhesive member 1310, other than the opening 1054, may be disposed on the bottom surface 1512 so as to surround the opening 1501 in the holder 1600.

The length DL3 of the opening 1054 in the longitudinal direction of the inner side surface 1511*a*, in which the groove portion 1504 is positioned, may be the same as the length DL1 of the groove portion 1504 in the longitudinal direction of the inner side surface 1511*a* shown in FIG. 16 (DL3=DL1), without being limited thereto.

In another embodiment, the length DL3 of the opening 1054 may be less than the length DL1 of the groove portion 1504 (DL3<DL1). Since DL3 is less than DL1 (DL3<DL1), when the second adhesive member 1330 is placed in the opening 1054, the second adhesive member 1330 completely fills the opening 1054, with the result that the space between the bottom of the filter 1610 and the bottom surface 1512 of the seating portion 1500 of the holder 1600 is sealed.

Subsequently, referring to FIG. 18, the filter 1610 is attached to the seating portion 1500, on which the first adhesive member 1310 has been formed, and the first adhesive member 1310 is cured. For example, the first adhesive member 1310 may be a UV curable adhesive member, e.g. UV epoxy.

Subsequently, referring to FIG. 19, an adhesive member 1320 corresponding to the lower portion of the holder 1600 (e.g. the second lower surface 1604) is formed on the upper surface of the printed circuit board 1800, the holder 1600 is attached to the printed circuit board 1800, on which the adhesive member 1320 has been formed, and the adhesive member 1320 is cured.

For example, the adhesive member 1320 may be a thermosetting adhesive member, e.g. thermosetting epoxy.

FIG. 19 is a bottom view of the holder 1600. As shown in FIG. 19, the lower surface of the holder 1600 may include a first lower surface 1602 corresponding to the bottom portion 1512 of the seating portion 1500 and a second lower surface 1604 protruding from the first lower surface 1602 in the optical-axis direction and disposed around the first lower surface 1602.

The holder 1600 may include a lower protruding portion 1604*a* protruding from the first lower surface 1602.

For example, the first lower surface 1602 of the holder 1600 may be the surface that is positioned opposite the bottom surface 1512 of the seating portion 1500.

For example, the second lower surface 1604 of the holder 1600 may be the lower surface of the lower protruding portion 1604*a*.

The lower protruding portion 1604*a* of the holder 1600 may be positioned so as to be connected to or contiguous with the edge of the first lower surface 1602 of the holder 1600, and may be contiguous with the outer side surface of the holder 1600.

The lower surface of the lower protruding portion 1604*a* of the holder 1600, i.e. the second lower surface 1604, may have a height difference from the first lower surface 1602 in the optical-axis direction.

The shape of the lower protruding portion 1604*a* viewed from below may be a rectangular shape, and the lower protruding portion 1604*a* may include a protrusion 1604*b* protruding from the outer side surface of the edge of the lower protruding portion 1604*a* in a direction perpendicular to the optical axis or in the horizontal direction. Here, the adhesive member 1320 may include a portion corresponding to the lower surface of the protrusion 1604*b*. Since the protrusion 1604b is also attached to the printed circuit board 1800 using the adhesive member 1320, the protrusion 1604b increases the contact area with the printed circuit board 1800, thereby increasing the bonding force between the holder 1600 and the printed circuit board 1800.

For example, the shape of the adhesive member 1320 formed on the printed circuit board 1800 may match the shape of the lower protruding portion 1604a of the holder 1600.

After the adhesive member 1320 is formed on the printed circuit board 1800, the second lower surface 1604 of the holder 1600 may be attached to the adhesive member 1320, without being limited thereto. In another embodiment, after the adhesive member 1320 is formed on the second lower surface 1604 of the holder 1600, the adhesive member 1320 may be attached to the upper surface of the printed circuit board 1800.

For example, the adhesive member 1320 may not overlap the first adhesive member 1310 in the optical-axis direction. The adhesive member 1320 may have a closed-loop shape corresponding to the second lower surface 1604 of the holder 1600.

When the holder 1600 is attached to the adhesive member 1320 formed on the upper surface of the printed circuit board 1800 and the adhesive member 1320 is thermally cured, fumes may be generated through, for example, evaporation of a volatile material contained in the adhesive member 1320 during the thermal curing process. These fumes may contaminate or damage circuits and various elements of the printed circuit board 1800.

The fumes generated during the process of thermally curing the adhesive member 1320 may be discharged to the outside of the holder 1600 through the space between the printed circuit board 1800 and the first lower surface 1602 of the holder 1600, the opening 1054 in the first adhesive member 1310 formed on the bottom surface 1512 of the holder 1600, and the groove portion 1504 in the holder 1600. For example, the fumes generated during the process of thermally curing the adhesive member 1320 may be discharged to the outside along the path 85 shown in FIG. 9.

After the adhesive for forming the adhesive member 1320 is completely cured and the fumes are completely discharged to the outside, an adhesive for forming the second adhesive member 1330 is applied to the groove portion 1504.

The second adhesive member 1330 may be disposed in the groove portion 1504 in the holder 1600, and may be coupled to the filter 1610. The second adhesive member 1330 may include a region or a shape corresponding to the groove portion 1504 in the holder 1600.

The second adhesive member 1330 may be disposed in the groove portion 1504, and may be disposed between the lower surface of the filter 1610 and the opening in the first adhesive member 1310 so as to fill the gap between the lower surface of the filter 1610 and the opening 1054 in the first adhesive member 1310.

The second adhesive member 1330 may be in contact with both ends of the first adhesive member 1310, which are positioned on both sides of the opening 1054 in the first adhesive member 1310.

The second adhesive member 1330 may be in contact with the side surface of the filter 1610 that corresponds to or faces the groove portion 1504.

Referring to FIG. 21, the second adhesive member 1330 may include a first portion 1330a disposed in the groove portion 1504 in the holder 1600 and a second portion 1330b disposed between the opening 1054 in the first adhesive member 1310 and the lower surface of the filter 1610.

The second adhesive member 1330 may be disposed in at least a portion of the opening 1054 in the first adhesive member 1310.

For example, the second adhesive member 1330 may connect both open ends of the first adhesive member 1310 to each other to form a closed loop together with the first adhesive member 1310.

The height DH1 to the first portion 1330a of the second adhesive member 1330 may be less than the depth DH3 of the groove portion 1504 (DH1<DH3). The reason for this is to prevent the second adhesive member 1330 from overflowing out of the groove portion 1504.

The height DH1 to the first portion 1330a may be the height from the bottom surface of the groove portion 1504 (or the bottom surface 1512 of the seating groove 1500).

For example, the height DH1 to the first portion 1330a of the second adhesive member 1330 may be less than the height DH2 to the upper surface of the filter 1610 (DH1<DH2). The reason for this is to prevent deterioration in the performance of the filter 1610 or damage to the filter 1610 due to overflow of the second adhesive member 1330 to the upper surface of the filter 1610. Here, the height to the upper surface of the filter 1610 may be the height from the bottom surface 1512 of the seating groove 500.

The second adhesive member 1330 may be a UV curable adhesive, for example, UV epoxy.

The space between the lower surface of the holder 1600 and the upper surface of the printed circuit board 1800 may be sealed by the second adhesive member 1330.

Figure 23A:
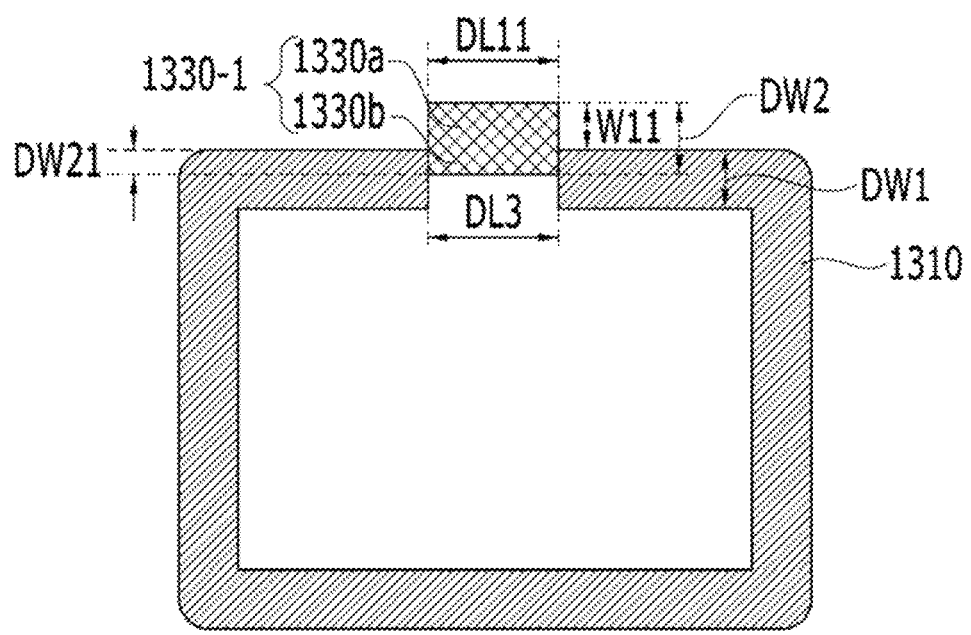
FIG. 23A shows another embodiment of the second adhesive member.

FIG. 23A shows a second adhesive member 1330-1 according to an embodiment.

Referring to FIG. 23A, the second adhesive member 1330-1 may include a first portion 1330a disposed in the groove portion 1504 and a second portion 1330b disposed in the opening 1054 in the first adhesive member 1310.

For example, the length of the first portion 1330a of the second adhesive member 1330-1 and the length DL11 of the second portion 1330b of the second adhesive member 1330 may be the same as each other. Further, the length DL11 of the second portion 1330b of the second adhesive member 1330 may be the same as the length DL3 of the opening 1054 in the first adhesive member 1310 (DL11=DL3).

Here, the length DL11 of each of the first portion 1330a and the second portion 1330b may be the length of each of the first portion 1330a and the second portion 1330b in the transverse direction. Alternatively, for example, DL11 may be the length in a direction parallel to the longitudinal direction (or the transverse direction) of the first inner side surface 1511a of the seating portion 1500.

The second portion 1330b of the second adhesive member 1330-1 may be positioned between opposite ends of the first adhesive member 1310, which are positioned on both sides of the opening 1054 in the first adhesive member 1310, and may be connected to opposite ends of the first adhesive member 1310.

For example, the first portion 1330a of the second adhesive member 1330-1 may protrude from the first adhesive member 1310 in a direction from the first adhesive member 1310 toward the groove portion 1504.

The width DW2 of the second adhesive member 1330-1 may be greater than the width DW1 of the first adhesive member 1310 (DW2>DW1). For example, the width DW2 of the second adhesive member 1330-1 may be the length of the second adhesive member 1330-1 in the vertical direction or the length of the second adhesive member 1330-1 in a direction perpendicular to the longitudinal direction of the first inner side surface 1511*a*.

For example, the width DW11 of the first portion 1330*a* of the second adhesive member 1330-1 may be greater than the width DW21 of the second portion 1330*b* of the second adhesive member 1330-1 (DW11>DW21).

For example, the width DW21 of the second portion 1330*b* of the second adhesive member 1330-1 may be less than or equal to the width DW1 of the first adhesive member 1310 (DW21≤DW1).

The second adhesive member 1330-1 may protrude from the first adhesive member 1310 in a direction from the second inner side surface 1511*b* of the seating portion 1500 toward the first inner side surface 1511*a*.

Figure 23B:
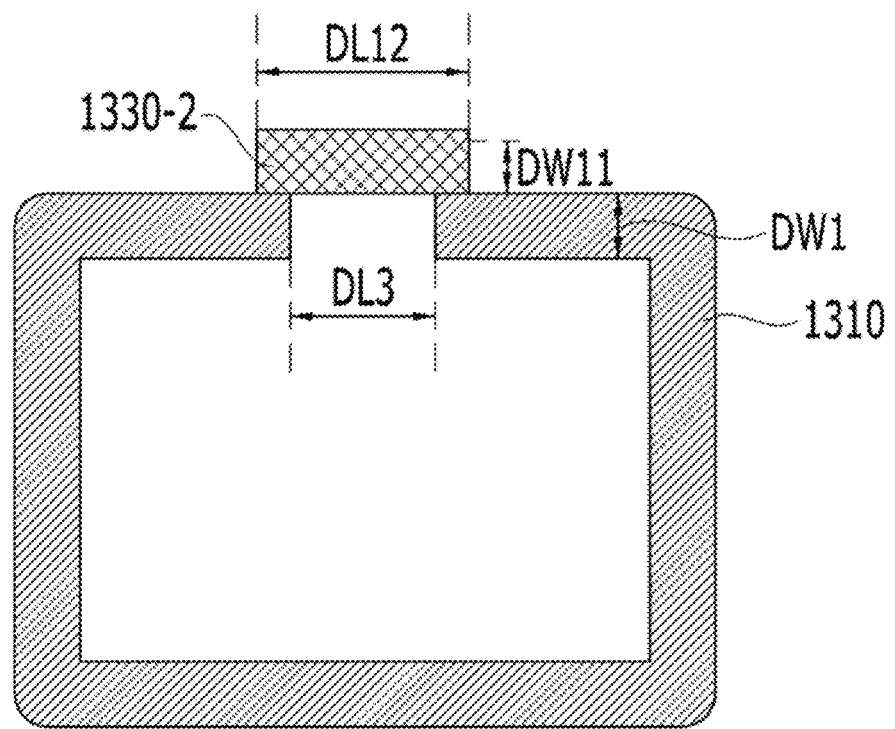
FIG. 23B shows still another embodiment of the second adhesive member.

FIG. 23B shows a second adhesive member 1330-2 according to another embodiment.

Referring to FIG. 23B, the second adhesive member 1330-2 may include a first portion, which is disposed in the groove portion 1504 in the seating portion 1500 and is in contact with the outer side surfaces of opposite ends of the first adhesive member 1310, which are disposed on both sides of the opening 1054. For example, the second adhesive member 1330-2 may not include a portion that is disposed in the opening 1054 in the first adhesive member 1310.

The length DL12 of the second adhesive member 1330-2 may be greater than the length DL3 of the opening 1054 in the first adhesive member 1310 (DL12>DL3).

Further, the width DW11 of the second adhesive member 1330-2 may be less than or equal to the width DW1 of the first adhesive member 1310 (DW11≤DW1).

Figure 23C:
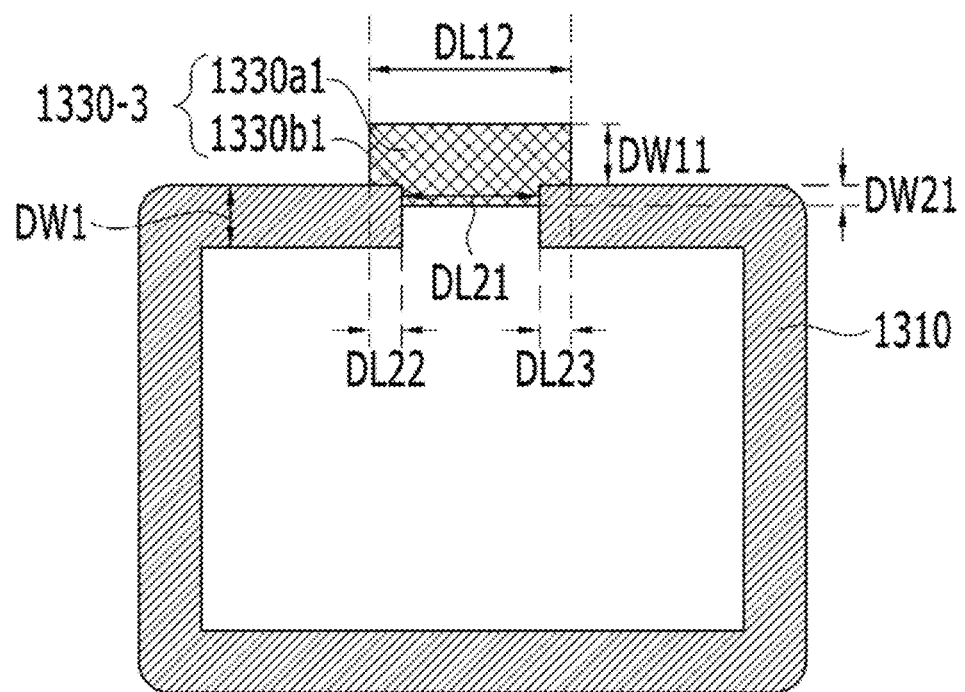
FIG. 23C shows still another embodiment of the second adhesive member.

FIG. 23C shows a second adhesive member 1330-3 according to still another embodiment.

Referring to FIG. 23C, the second adhesive member 1330-3 may include a first portion 1330*a*1 disposed in the groove portion 1504 and a second portion 1330*b*1 disposed in the opening 1054 in the first adhesive member 1310.

The length DL12 of the first portion 1330*a*1 may be greater than the length DL21 of the second portion 1330*b*1 (DL12>DL21). Further, the width DW11 of the first portion 1330*a*1 may be greater than the width DW21 of the second portion 1330*b*1 (DW11>DW21).

The first portion 1330*a*1 may be in contact with the outer side surfaces of opposite ends of the first adhesive member 1310, which are disposed on both sides of the opening 1054. The second portion 1330*b*1 may be positioned between opposite ends of the first adhesive member 1310, and may be connected to opposite ends of the first adhesive member 1310.

The length (DL22+DL23) of the first portion 1330*a*1, which does not overlap the second portion 1330*b*1 in a direction from the opening 1054 toward the groove portion 1504 or a direction from the inner side surface 1511*b* of the seating portion 1500 toward the inner side surface 1511*a* thereof, may be less than the length DL21 of the second portion 1330*b*1 (DL22+DL23<DL21).

Although the first adhesive member 1310 and the second adhesive member 1330 have been described above as being provided separately from each other, the embodiment is not limited thereto. The first adhesive member 1310 and the second adhesive member 1330 may be made of the same material, and may be implemented as an integrated adhesive member. In this case, the first adhesive member 1310 described above may correspond to a first portion (or a first region) of the integrated adhesive member, and the second adhesive member 1330 described above may correspond to a second portion (or a second region) of the integrated adhesive member.

In general, in the case of an active-alignment-type camera module, after an image sensor, a printed circuit board, and a holder are assembled, an adhesive is applied to the upper surface of the holder, and the assembly of a lens-moving apparatus and a lens is mounted to the holder, to which the adhesive has been applied.

In this case, in order to attach the holder to the printed circuit board, a thermosetting adhesive, e.g. thermosetting epoxy, is primarily applied to the printed circuit board. At this time, an air vent is formed in the thermosetting adhesive applied to the printed circuit board in order to discharge fumes generated during the process of curing the thermosetting adhesive. In addition, after the holder is attached to the printed circuit board, a process of secondarily applying a thermosetting adhesive to the air vent region is performed.

Since the curing time of a thermosetting adhesive is much longer than that of a UV curable adhesive, when the process of curing the thermosetting adhesive is performed twice, as described above, it takes a very long time.

Further, since a secondary thermosetting adhesive is injected into the gap between the printed circuit board and the holder, bubbles may be easily generated and may burst during thermal curing, and voids may be formed. Dark spots may be generated in the image sensor due to introduction of foreign substances through the voids formed in the secondary thermosetting adhesive, and the printed circuit board and the image sensor may be contaminated due to permeation of a cleaning liquid during wet cleaning.

In the embodiment, the opening 1054 for sealing a gap is formed in the first adhesive member 1310 for attaching the filter 1610 and the holder 1600 to each other, whereby it is possible to discharge fumes generated during the process of thermally curing the adhesive member 1320 to couple the printed circuit board 1800 and the holder 1600 to each other.

In addition, since the groove portion 1504 corresponding to the opening 1054 in the first adhesive member 1310 is formed in the holder 1600, it is possible to smoothly discharge fumes generated during the process of thermally curing the adhesive member 1320 to couple the printed circuit board 1800 and the holder 1600 to each other, to enable the second adhesive member 1330 to easily and smoothly enter the space between the filter 1610 and the bottom surface 1512 of the seating portion 1500 of the holder 1600, and to prevent the formation of voids during a curing process.

Further, since the second adhesive member 1330, which is a UV curable adhesive, is transparent, it is possible to easily determine with the naked eye whether the opening in the first adhesive member 1310 and the groove portion 1504 in the holder 1600 are not filled with the second adhesive member 1330, to prevent insufficient charging of the second adhesive member 1330, and to prevent introduction of a cleaning liquid (e.g. DI water) and foreign substances during wet cleaning, thus preventing damage to the printed circuit board and the image sensor.

In addition, since a UV curable adhesive is used as the second adhesive member 1330, it is possible to prevent bursting or cracking of a thermosetting adhesive due to voids formed during the process of curing the thermosetting adhesive.

In addition, since the thermal curing process for attaching the printed circuit board 1800 and the holder 1600 to each other is performed once, it is possible to reduce the curing process time. Although the UV curing process is performed twice, the thermal curing process time is about 20 times the UV curing process time.

The first adhesive member 1320 and the second adhesive member 1330 of the camera module of FIGS. 14 to 21 may be formed of different materials from each other, without being limited thereto. In another embodiment, the first adhesive member 1320 and the second adhesive member 1330 may be formed of the same material as each other.

The description of the inner side surface 511 and the bottom 512 of the seating portion 500 of the holder 600 of FIG. 3, the first surface 601 and the second surface 602 of the inner side surface 511, the spacing distance from the first surface 601 to the side surface of the filter 610, the spacing distance from the second surface 602 to the side surface of the filter 610, the relationship between the spacing distances and the thickness of the filter 610, the relationship with the adhesive member, and the relationship with the blocking member may be equally or similarly applied to the embodiment including the holder 1600 of FIG. 16.

In addition, the description of the seating portion 1500 of the holder 1600 of FIG. 16, the groove portion 504 in the holder 1600, the first adhesive member 310, and the second adhesive members 330, 330-1, 330-2 and 330-3 may be equally or similarly applied to the embodiment including the holder 600 of FIG. 3. That is, the embodiment of FIG. 1 and the embodiment of FIG. 14 may be equally or similarly applied to each other.

The camera module according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image by a lens, or for the purpose of optical measurement or image propagation or transmission. For example, the optical instrument according to the embodiment may include a smartphone and a portable terminal equipped with a camera.

Figure 24:
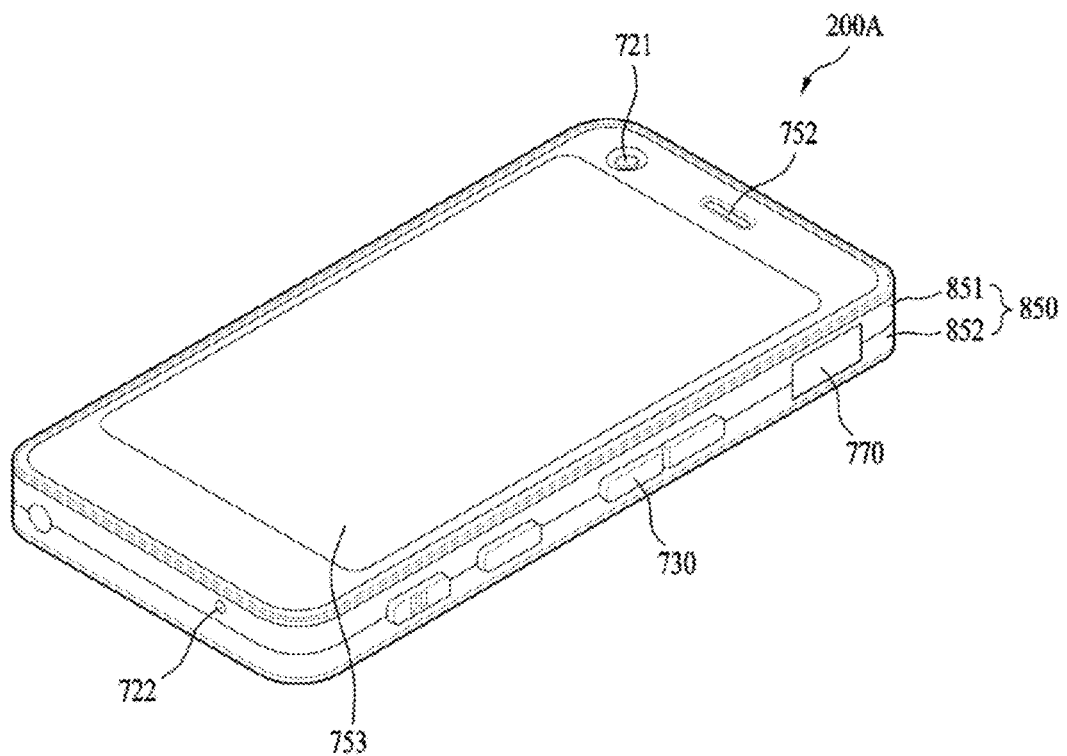
FIG. 24 is a perspective view of a portable terminal according to an embodiment.
Figure 25:
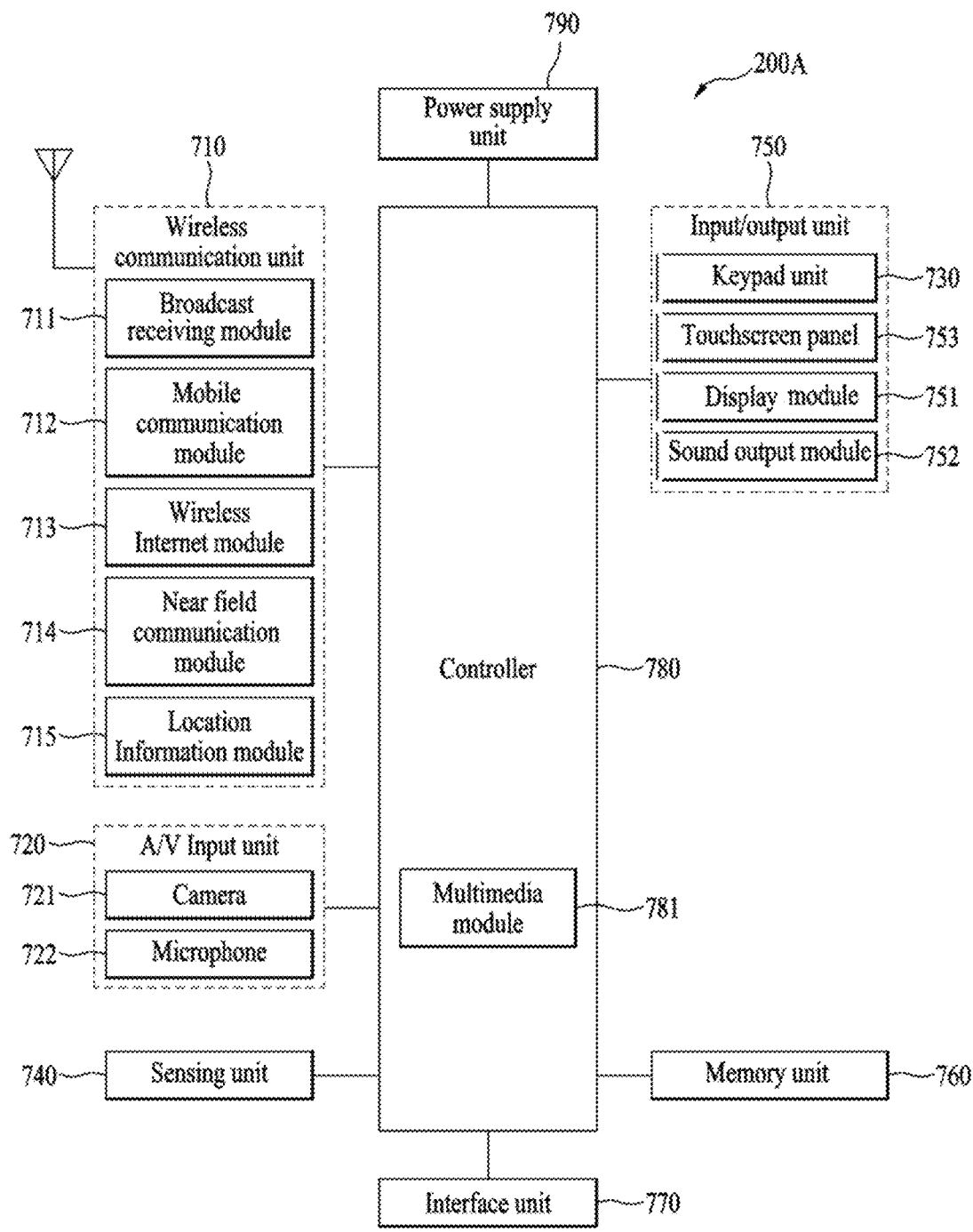
FIG. 25 is a configuration diagram of the portable terminal shown in FIG. 24.

FIG. 24 is a perspective view of a portable terminal 200A according to an embodiment, and FIG. 25 is a configuration diagram of the portable terminal 200A shown in FIG. 24.

Referring to FIGS. 24 and 25, the portable terminal 200A (hereinafter referred to as a "terminal") may include a body 850, a wireless communication unit 710, an A/V input unit 720, a sensor 740, an input/output unit 750, a memory 760, an interface 770, a controller 780, and a power supply 790.

The body 850 shown in FIG. 24 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance thereof. For example, the body 850 may be divided into a front case 851 and a rear case 852. A variety of electronic components of the terminal may be mounted in the space formed between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast reception module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera module 200, 1000 or 1200 according to the embodiment.

The sensor 740 may sense the current state of the terminal 200A, such as the open or closed state of the terminal 200A, the location of the terminal 200A, the presence or absence of a user's touch, the orientation of the terminal 200A, or the acceleration/deceleration of the terminal 200A, and may generate a sensing signal to control the operation of the terminal 200A. For example, when the terminal 200A is a slide-type phone, whether the slide-type phone is open or closed may be detected. In addition, the sensor 740 serves to sense whether power is supplied from the power supply 790 or whether the interface 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. For example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images.

The interface 770 serves as a passage for connection between the terminal 200A and an external device. The interface 770 may receive data or power from the external device, and may transmit the same to respective components inside the terminal 200A, or may transmit data inside the terminal 200A to the external device. For example, the interface 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the general operation of the terminal 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touchscreen is perceived as characters or images.

The power supply 790 may supply power required to operate the respective components upon receiving external power or internal power under the control of the controller 780.

The features, structures, effects and the like described above in the embodiments are included in at least one embodiment of the present disclosure, but are not necessarily limited to only one embodiment. Furthermore, the features, structures, effects and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

The embodiments may be used in a camera module and an optical device capable of suppressing or preventing collision of a filter and a blocking member with a holder due to external impacts and suppressing shifting or rotation of the filter when the filter is attached to a seating portion of the holder.

The invention claimed is:

1. A camera module, comprising:
    a lens barrel configured to be movable in an optical-axis direction;
    a holder disposed under the lens barrel and comprising a seating portion recessed from an upper surface thereof, a first opening formed in a bottom surface of the seating portion, and a groove portion formed in an inner side surface of the seating portion;
    a filter disposed on the bottom surface of the seating portion;
    a first adhesive member disposed between the bottom surface of the seating portion and a lower surface of the filter and comprising a second opening;
    a second adhesive member disposed in the groove portion to be coupled to the filter, the second adhesive member comprising a first portion disposed in the groove portion of the holder and a second portion disposed between the second opening of the first adhesive member and the lower surface of the filter; and
    an image sensor disposed under the filter.

2. The camera module according to claim 1, wherein the groove portion is positioned in a first inner side surface, which is positioned between two adjacent corners of the seating portion.

3. The camera module according to claim 1, wherein the inner side surface of the seating portion comprises a first inner side surface facing a first side surface of the filter, and
    wherein the groove portion in the seating portion is formed in the first inner side surface,
    and is recessed from the first inner side surface in a direction from the first side surface of the filter toward the first inner side surface.

4. The camera module according to claim 3, wherein a length of the second opening in the first adhesive member in a longitudinal direction of the first inner side surface is less than a length of the groove portion in the longitudinal direction of the first inner side surface.

5. The camera module according to claim 3, wherein a width of the second adhesive member is greater than a width of the first adhesive member.

6. The camera module according to claim 1, wherein the groove portion is open to the upper surface of the holder and connected to the bottom surface of the seating portion.

7. The camera module according to claim 1, wherein the groove portion does not overlap the filter in the optical-axis direction.

8. The camera module according to claim 1, wherein the second portion of the second adhesive member protrudes from the first adhesive member.

9. The camera module according to claim 1, wherein the second adhesive member connects both open ends of the first adhesive member to each other to form a closed loop together with the first adhesive member.

10. The camera module according to claim 1, further comprising:
    a printed circuit board disposed under the holder; and
    a third adhesive member disposed between the printed circuit board and a lower surface of the holder.

11. The camera module according to claim 10, wherein each of the first and second adhesive members is a UV curable adhesive member.

12. The camera module according to claim 11, wherein the third adhesive member is a thermosetting adhesive member.

13. The camera module according to claim 1, wherein the first adhesive member and the second adhesive member is formed of a same material as each other.

14. The camera module according to claim 1, wherein the second portion of the second adhesive member overlaps the filter in the optical-axis direction.

15. The camera module according to claim 1, wherein the first adhesive member is disposed so as to have a predetermined width within a predetermined region from the inner side surface of the seating portion.

16. The camera module according to claim 1, wherein the second opening of the first adhesive member serves as an air vent for discharging fumes generated when the second adhesive member is cured.

17. The camera module according to claim 1, wherein a height to the first portion of the second adhesive member is less than a depth of the groove portion.

18. An optical instrument comprising the camera module according to claim 1.

19. A camera module, comprising:
    a holder comprising a seating portion recessed from an upper surface thereof and a groove portion formed in an inner side surface of the seating portion;
    a filter disposed on a bottom surface of the seating portion;
    a first adhesive member disposed between the bottom surface of the seating portion and a lower surface of the filter and comprising an opening;
    a second adhesive member disposed in the groove portion to be coupled to the filter;
    a lens barrel disposed on the filter and spaced apart from the filter; and
    an image sensor disposed under the filter,
    wherein the second adhesive member is configured to close the opening of the first adhesive member.

20. A camera module, comprising:
    a lens barrel configured to be movable in an optical-axis direction;
    a holder disposed under the lens barrel and comprising a seating portion recessed from an upper surface thereof, a first opening formed in a bottom surface of the seating portion, and a groove portion formed in an inner side surface of the seating portion;
    a filter disposed on the bottom surface of the seating portion;

a first adhesive member disposed between the bottom surface of the seating portion and a lower surface of the filter and comprising a second opening;
a second adhesive member disposed in the groove portion to be coupled to the filter; and
an image sensor disposed under the filter,
wherein the second opening of the first adhesive member serves as an air vent for discharging fumes generated when the second adhesive member is cured.

* * * * *